(12) United States Patent
Pall et al.

(10) Patent No.: US 11,927,808 B2
(45) Date of Patent: Mar. 12, 2024

(54) HOLDER FOR AN OPTICAL COMPONENT

(71) Applicant: CommScope Technologies LLC, Hickory, NC (US)

(72) Inventors: Peter Pall, Brno (CZ); David Novak, Trest (CZ); Bart Mattie Claessens, Hasselt (BE); Geert Van Genechten, Vorselaar (BE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/722,047

(22) Filed: Apr. 15, 2022

(65) Prior Publication Data
US 2022/0334318 A1 Oct. 20, 2022

Related U.S. Application Data

(60) Provisional application No. 63/331,006, filed on Apr. 14, 2022, provisional application No. 63/176,092, filed on Apr. 16, 2021.

(51) Int. Cl.
G02B 6/44 (2006.01)
G02B 6/36 (2006.01)

(52) U.S. Cl.
CPC ......... *G02B 6/3616* (2013.01); *G02B 6/4454* (2013.01)

(58) Field of Classification Search
None
See application file for complete search history.

(56) References Cited

U.S. PATENT DOCUMENTS

| 6,304,707 | B1 | 10/2001 | Daems et al. | |
|---|---|---|---|---|
| 7,310,471 | B2 | 12/2007 | Bayazit et al. | |
| 8,135,257 | B2 | 3/2012 | Cooke et al. | |
| 8,285,104 | B2 | 10/2012 | Davis et al. | |
| 8,538,227 | B2 | 9/2013 | Cowen et al. | |
| 8,687,934 | B2 | 4/2014 | Wright et al. | |
| 9,042,702 | B2 | 5/2015 | Rodriguez et al. | |
| 9,778,433 | B2 | 10/2017 | Kostecka et al. | |
| 11,199,674 | B2 | 12/2021 | Allen | |
| 2010/0183270 | A1* | 7/2010 | Davis ................. | G02B 6/4471 385/100 |
| 2012/0134639 | A1 | 5/2012 | Giraud et al. | |
| 2013/0105420 | A1 | 5/2013 | Ray et al. | |
| 2015/0234142 | A1 | 8/2015 | Courchaine et al. | |
| 2016/0161695 | A1* | 6/2016 | Chen ..................... | F16B 5/126 385/136 |
| 2017/0123175 | A1* | 5/2017 | Van Baelen ......... | G02B 6/3897 |
| 2021/0003798 | A1* | 1/2021 | Geling ................ | G02B 6/4455 |
| 2021/0181430 | A1* | 6/2021 | Van Baelen ........... | H04Q 1/06 |
| 2021/0191057 | A1* | 6/2021 | Liefsoens ........... | G02B 6/4248 |
| 2021/0239917 | A1* | 8/2021 | Claessens ........... | G02B 6/4454 |
| 2022/0171135 | A1* | 6/2022 | Claessens ........... | G02B 6/3616 |
| 2022/0221674 | A1* | 7/2022 | Allen .................. | G02B 6/4454 |
| 2022/0291470 | A1* | 9/2022 | Claessens ........... | G02B 6/4454 |

FOREIGN PATENT DOCUMENTS

| WO | 2019/160995 A9 | 8/2019 |
|---|---|---|
| WO | 2019/209643 A1 | 10/2019 |
| WO | WO 2020/198155 A1 * | 10/2020 |

* cited by examiner

*Primary Examiner* — Michael Stahl
(74) *Attorney, Agent, or Firm* — Merchant & Gould P.C.

(57) ABSTRACT

The present disclosure relates to a holder for attaching an optical component to a structure such as a tray. The holder includes integrated first mounting features including end tabs and integrated second mounting features including dovetail projections.

25 Claims, 28 Drawing Sheets

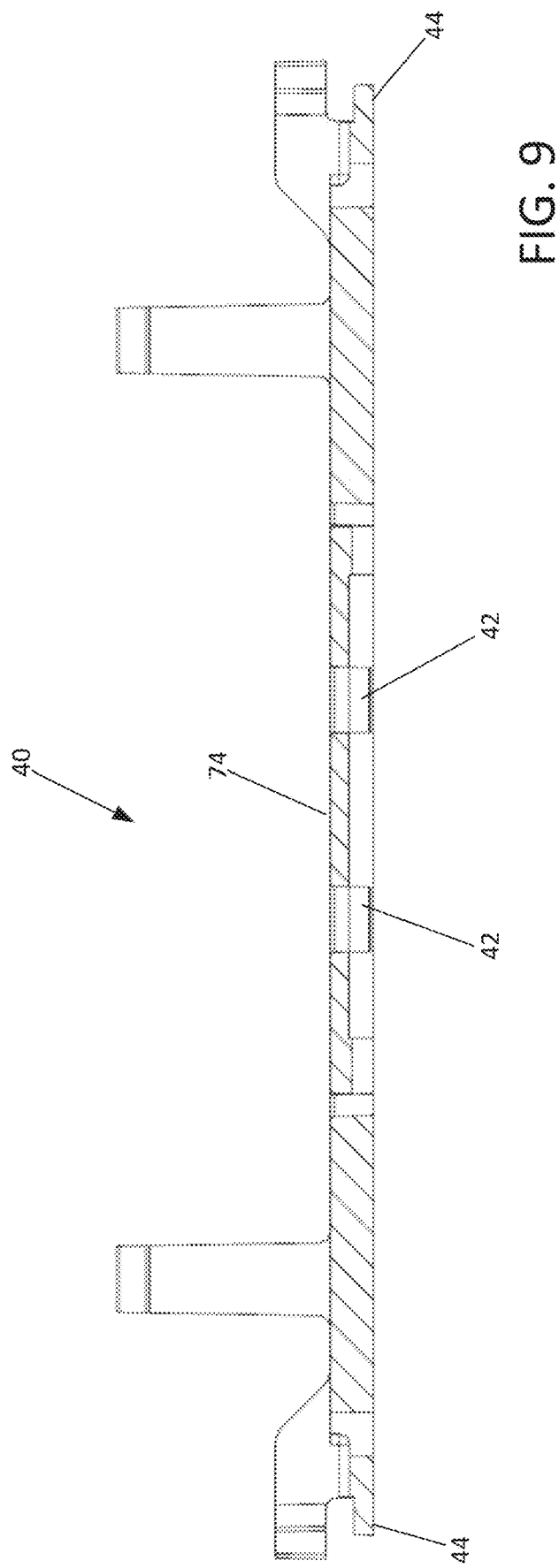

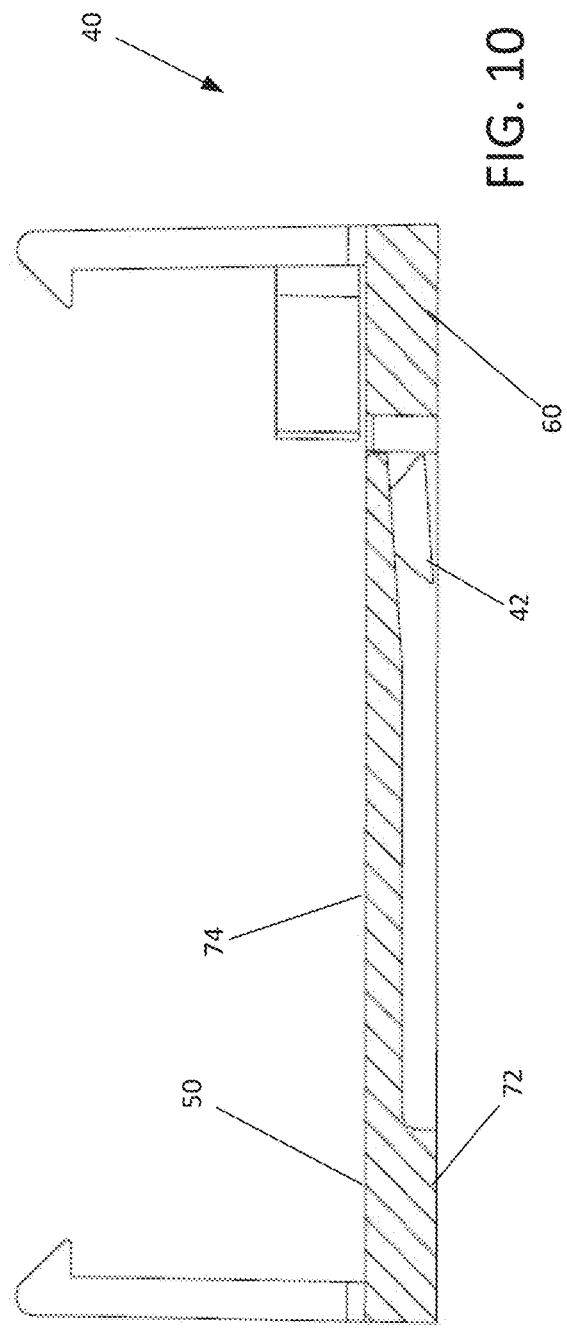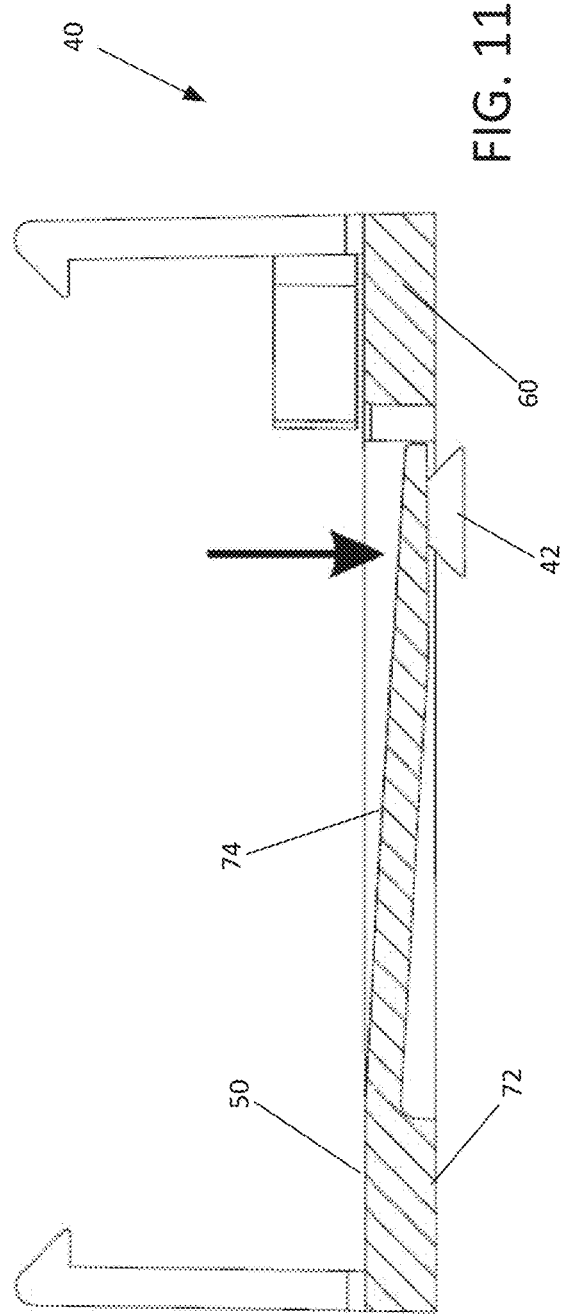

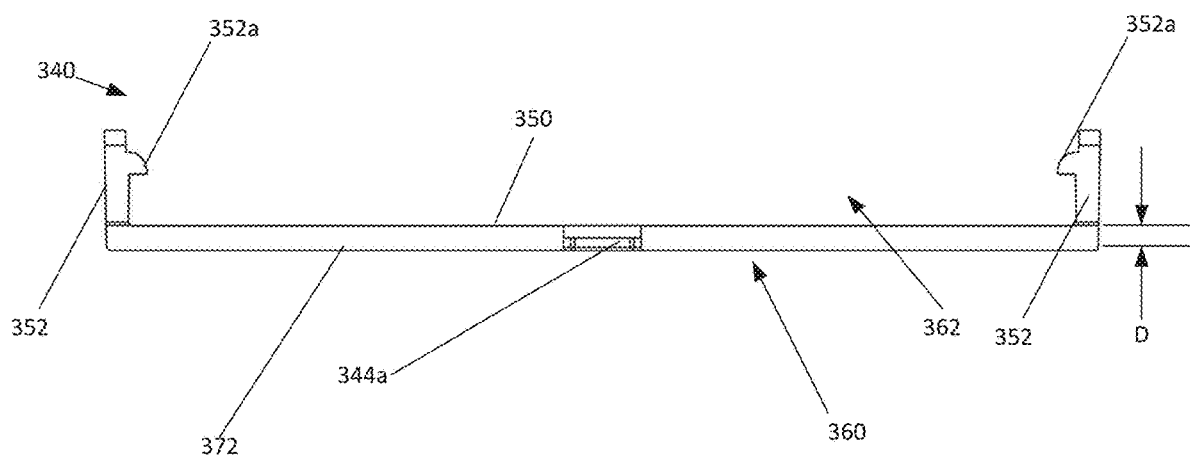
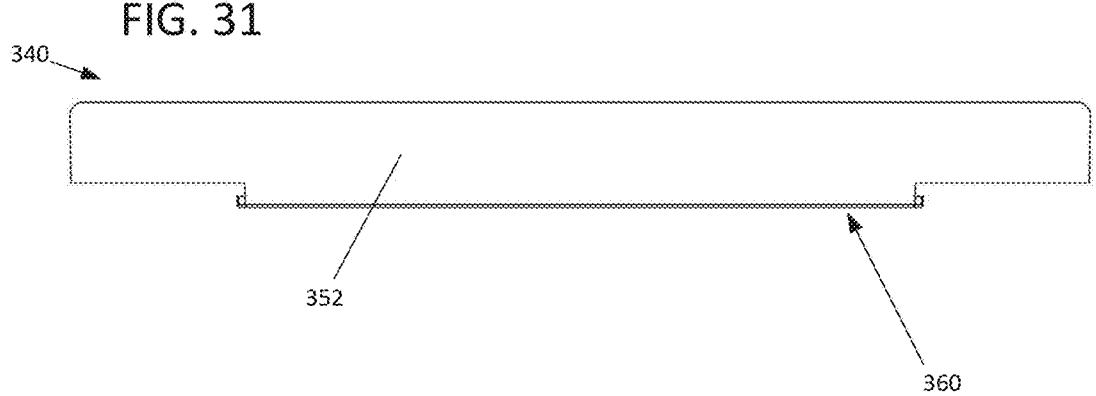

HOLDER FOR AN OPTICAL COMPONENT

CROSS REFERENCE TO RELATED APPLICATION

This application claims benefit of provisional applications having Ser. No. 63/331,006 filed Apr. 14, 2022, and Ser. No. 63/176,092 filed Apr. 16, 2021, which applications are incorporated herein by reference in their entirety.

TECHNICAL FIELD

The present disclosure relates generally to holders for securing optical components such as optical splice holders, passive optical splitter modules, optical tap modules and wavelength division multiplexer modules to structures such as trays, enclosures or panels.

BACKGROUND

In the telecommunications industry, component holders are used to secure components such as optical splice holders, passive optical splitter modules, optical tapping modules, and wavelength division multiplexer modules to structures such as trays, panels and enclosures. Currently, a variety of different styles of attachment arrangements are provided on structures such as trays, panels and enclosures for facilitating securing component holders thereto. For example, FIG. 1 depicts a prior art tray 20 having a plurality of attachment features 22 for securing component holders to the tray 20. Each of the attachment features 22 includes a pair of aligned grooves 24 each having a dovetail shaped cross-section. FIG. 2 depicts another prior art tray 30 having holder attachment arrangements 32 including semi-circular receptacles 34 provided at a recessed region 36 of the tray 30. Because different styles of holder attachment arrangements are provided on trays, enclosures and panels, service providers can be required to stock different types of component holders having different types of mounting features compatible with the different holder attachment arrangements that may be encountered in the field.

SUMMARY

One aspect of the present disclosure relates to a plate-style holder for holding an optical component. The holder has a top side at which an optical component holder can be secured (e.g. by latching, fasteners or other means). Different mounting features compatible with different styles of holder attachment arrangements are integrated with the holder. For example, dovetail projections can also be provided adjacent a bottom of the holder. The dovetail projections can provide a first type of connection structure compatible with a first holder attachment arrangement. Also, by way of example, mounting tabs can be provided at opposite ends of the holder. The mounting tabs can be resiliently movable in an orientation along a length of the holder. The mounting tabs can provide a second type of connection structure compatible with a second holder attachment arrangement. In certain examples, the dovetail projections can be integrated with one or more resilient features (e.g., a cantilever or cantilevers) that allow the dovetail projections to be moved relative to the holder in a direction corresponding to a depth or a thickness of the holder. In one example, the dovetail projections are resiliently movable relative to the holder between an elevated position in which the dovetail projections are positioned at the same level or higher than the mounting tabs and a depressed position in which the dovetail projections are positioned lower than the mounting tabs. In certain examples, the elevated position is in at rest position. By elevating the dovetail projections, the dovetail projections do not interfere with connecting the holder to a tray such as the tray having the second attachment arrangements. Additionally, if it is desired to mount the holder to a tray such as the tray having the first attachment arrangements, the dovetail projections can be flexed to the depressed position so as to be capable of being inserted into the dovetail grooves of the attachment arrangements.

Another aspect of the present disclosure relates to a holder for an optical component. The holder includes a holder body having a mounting location at which the optical component can be secured. The holder body has a length, a width, and a depth. The length extends between first and second ends of the holder body. The holder body also includes first and second sides that extend between the first and second ends. The width is defined between the first and second sides. The depth is perpendicular with respect to the length and the width. The holder includes first and second mounting tabs located at the first and second ends of the holder body. The mounting tabs are resiliently movable relative to the holder body in a first orientation along the length of the holder body. The holder also includes first and second dovetail projections resiliently movable relative to the holder body in a second orientation along the depth of the holder body.

Another aspect of the present disclosure relates to an optical component holder having an envelope-style configuration in which an optical component can be laterally loaded into the holder through a side opening. The holder can include first and second major sides defined by opposite first and second major walls which cooperate to define at least a portion of the pocket. The major walls can extend along a length of the holder between opposite first and second ends. First and second mounting tabs are located at the first and second ends adjacent the first major side. The first and second mounting tabs are resiliently movable relative to the holder body in an orientation along the length of the holder body. First and second dovetail projections are provided at the second major side of the holder body.

Another aspect of the present disclosure relates to a holder for an optical component that includes a holder body having a pocket at which the optical component can be secured. The holder body has a length, a width, and a depth. The length extends between first and second ends of the holder body. The holder body includes first and second main walls that oppose one another and that extend between the first and second ends. The pocket is defined between the first and second main walls. The width is defined between first and second sides of the holder body that extend between the first and second ends of the holder body. The first side includes a sidewall that interconnects the first and second main walls. The second side has an open configuration suitable for allowing the optical component to be inserted into the pocket through the second side. The first main wall defines a first major outer side of the holder body and the second main wall defines an opposite second major outer side of the holder body. The depth is perpendicular with respect to the length and the width of the holder body and extends between the first and second major outer sides of the holder body. The holder also includes first and second mounting tabs located at the first and second ends of the holder body adjacent the first major outer side of the holder. The first and second mounting tabs are resiliently movable relative to the holder body along the length of the holder body. The holder further includes first and second dovetail projections that project outwardly from the second major outer side of the holder body.

In some examples, the fiber optic component holders of the present disclosure include four dovetail projections.

In some examples, two dovetail projections are respectively integrated with a first resilient beam member, extending along the length of the holder body between two base ends, the two base ends each being attached to the holder body. Two beam members can be provided in one example.

In some examples, the body of the component holder includes an upper and a lower portion. The lower portion is stepped downward from the upper portion by a distance along the depth of the holder body. In some examples, the dovetail projections are integrated with the lower portion and the first and second mounting tabs are integrated with the upper portion. The lower portion is removable from the upper portion in some examples.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

FIG. 9 is a cross-sectional view taken along section line 9-9 of FIG. 6;

FIG. 10 is a cross-sectional view taken along section line 10-10 with a resilient cantilever of the component holder in an elevated state in which the resilient cantilever is at rest (i.e. not flexed);

FIG. 11 is a cross-sectional view along section 10-10 of FIG. 6 showing the resilient cantilever of FIG. 10 moved to a depressed position in which the resilient cantilever is resiliently flexed in a downward direction from the elevated state;

FIG. 30 is an end view of the optical component holder of FIG. 26;

FIG. 31 is a side view of the optical component holder of FIG. 26;

DETAILED DESCRIPTION

Figure 1:
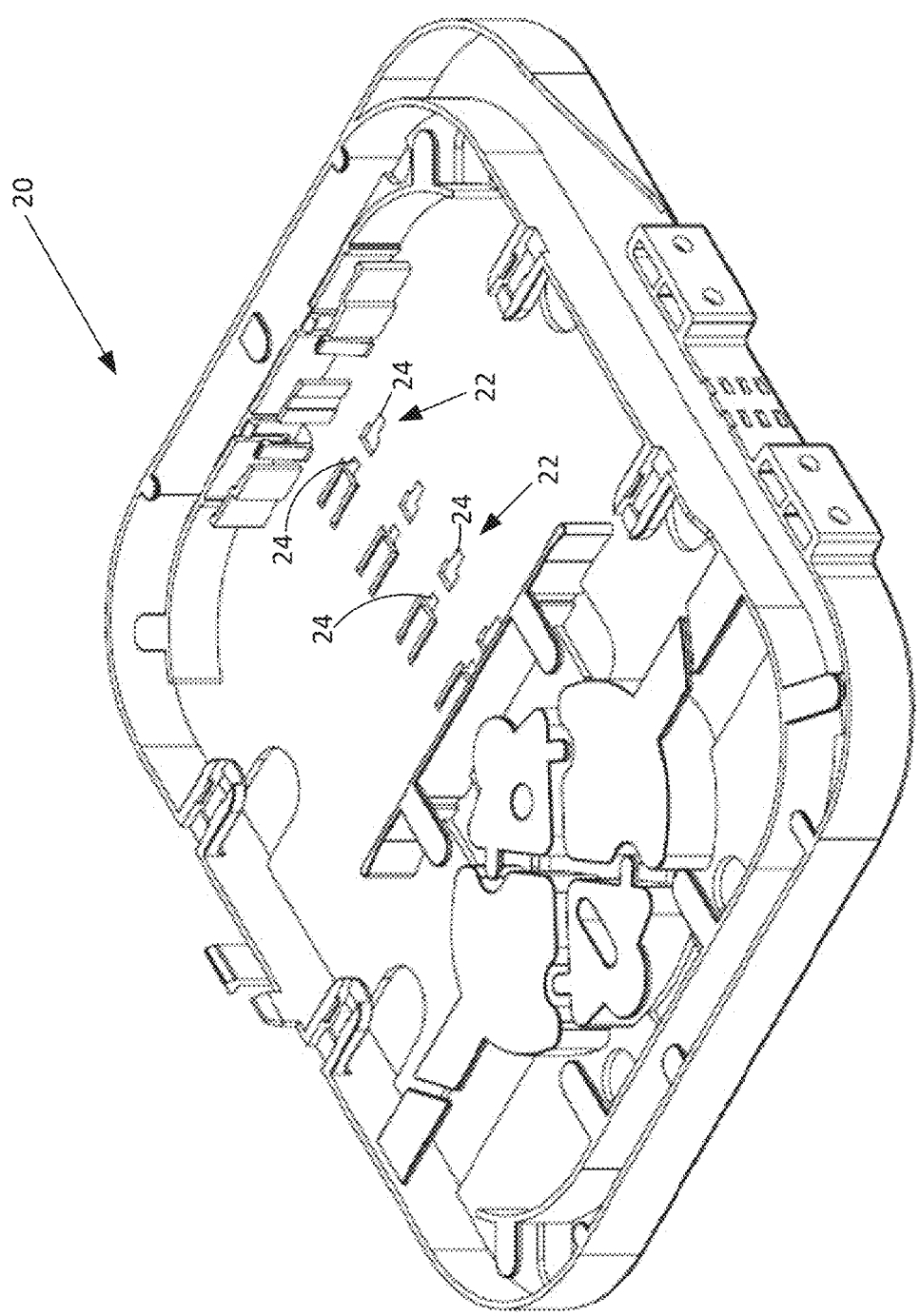
FIG. 1 is a perspective view of a first prior art tray having first attachment arrangements for affixing optical component holders to the tray.
Figure 2:
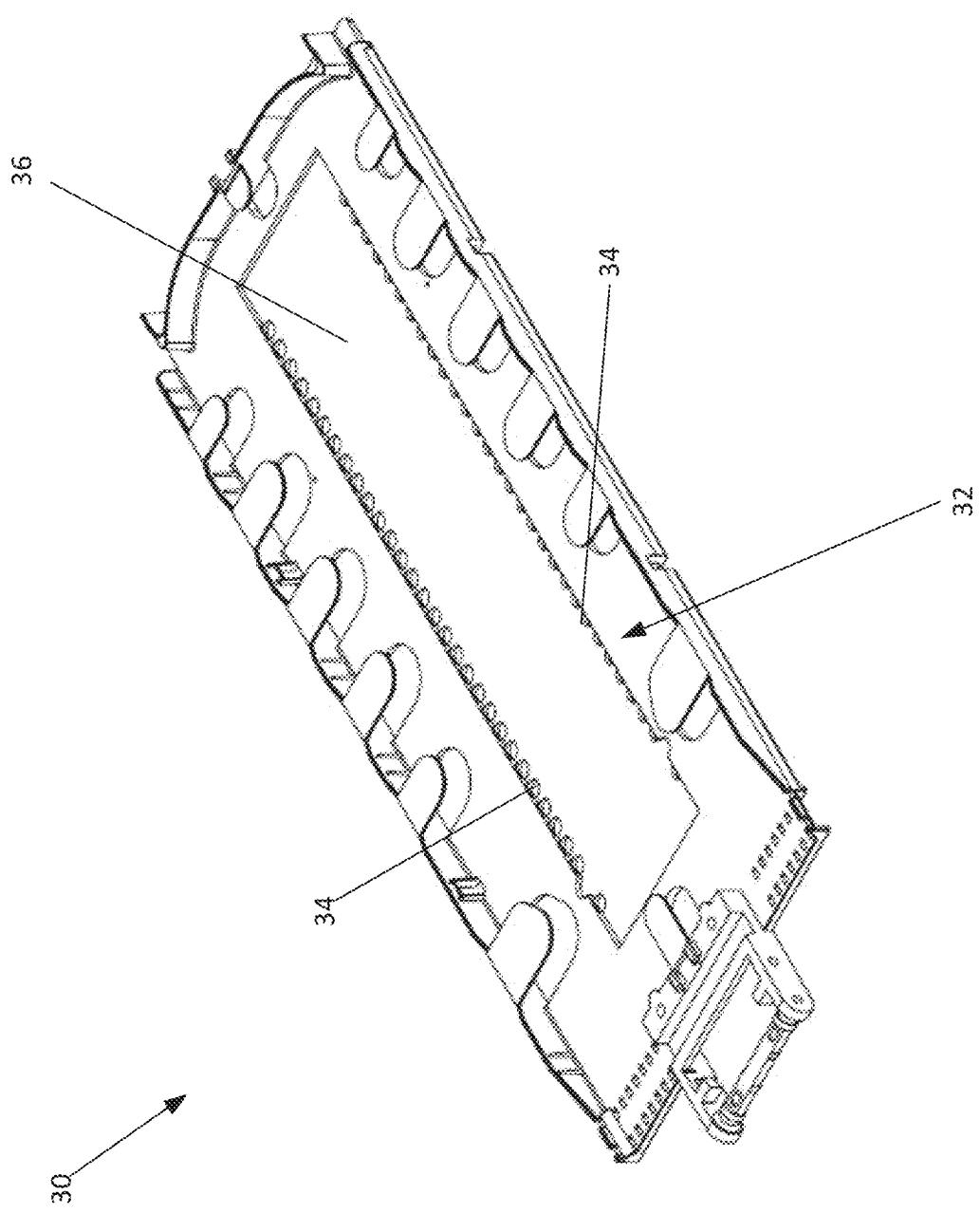
FIG. 2 is a perspective view of a second prior art tray having second attachment arrangements for affixing optical component holders to the tray.
Figure 12:
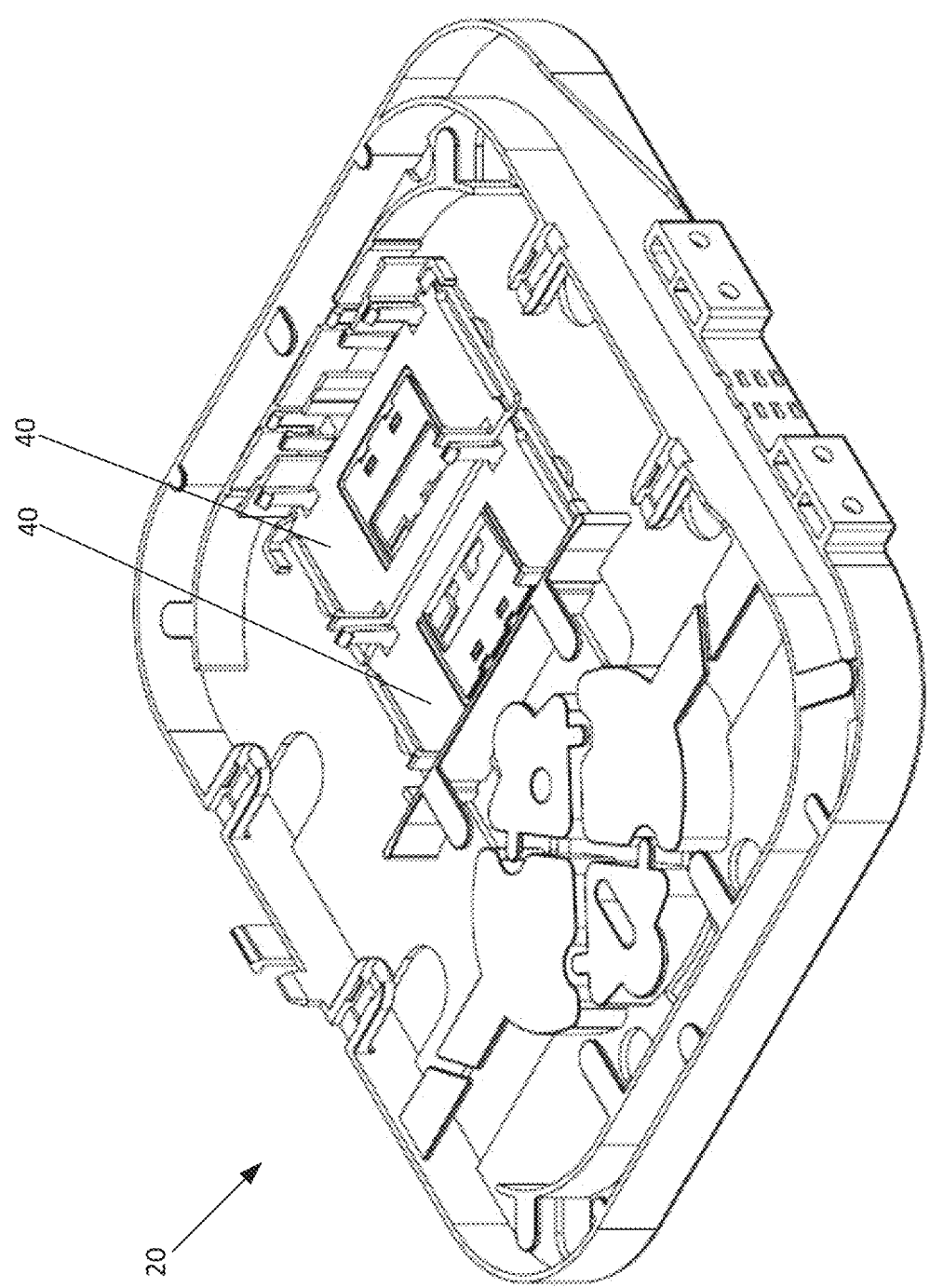
FIG. 12 is a perspective view depicting two of the component holders of FIG. 3 secured to the tray of FIG. 1.
Figure 13:
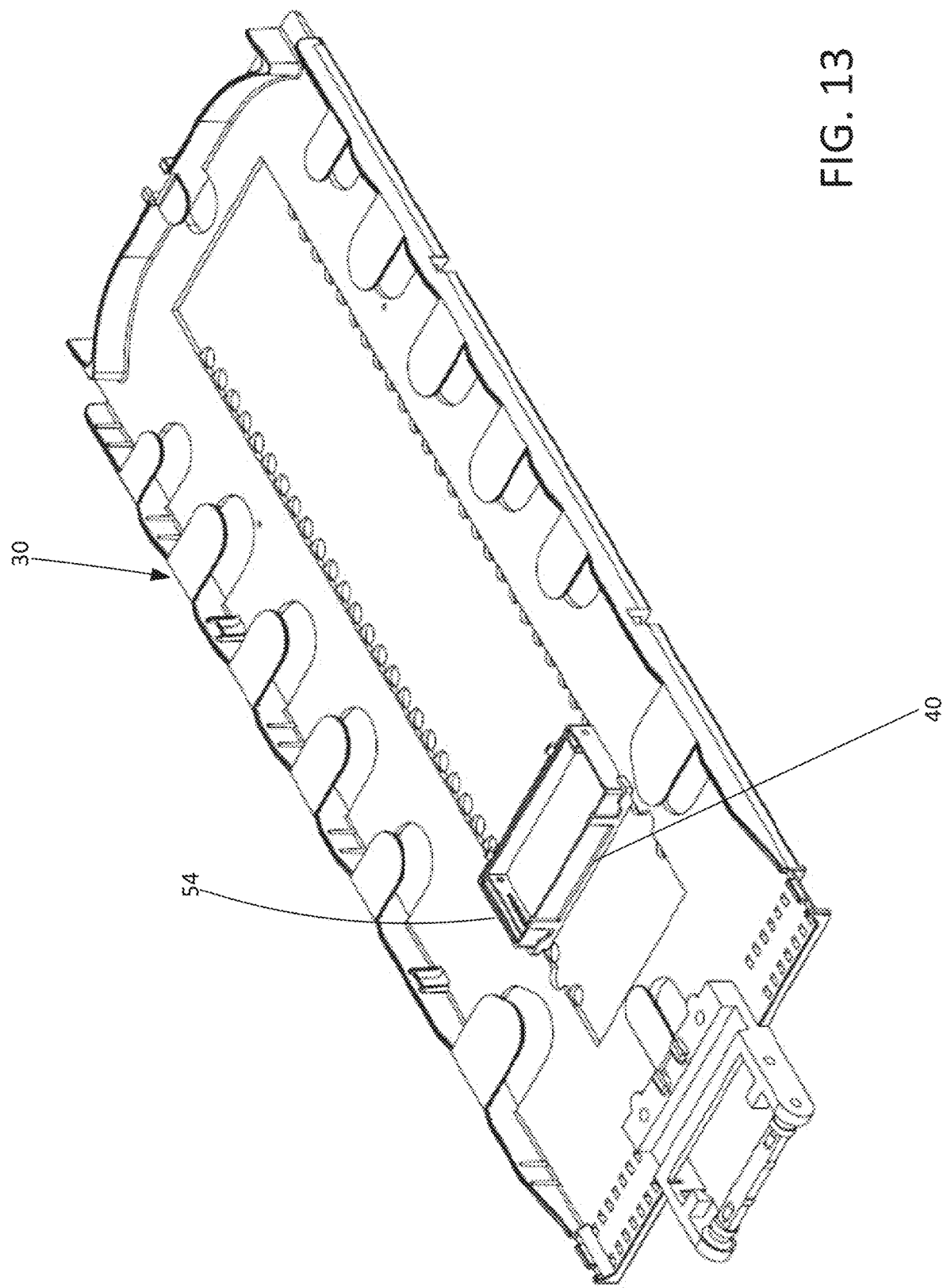
FIG. 13 is a perspective view depicting one of the component holders of FIG. 3 secured to the tray of FIG. 2, an optical component is also shown mounted to the optical component holder.
Figure 14:
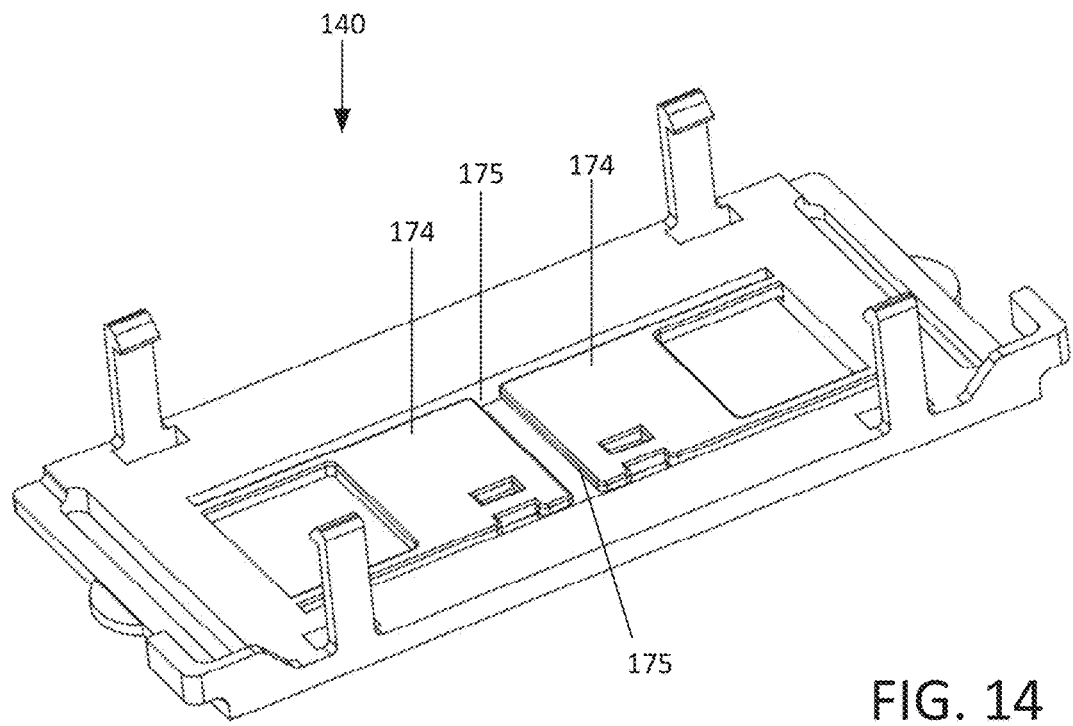
FIG. 14 is a perspective view depicting a top side of another optical component holder in accordance with the principles of the present disclosure.
Figure 15:
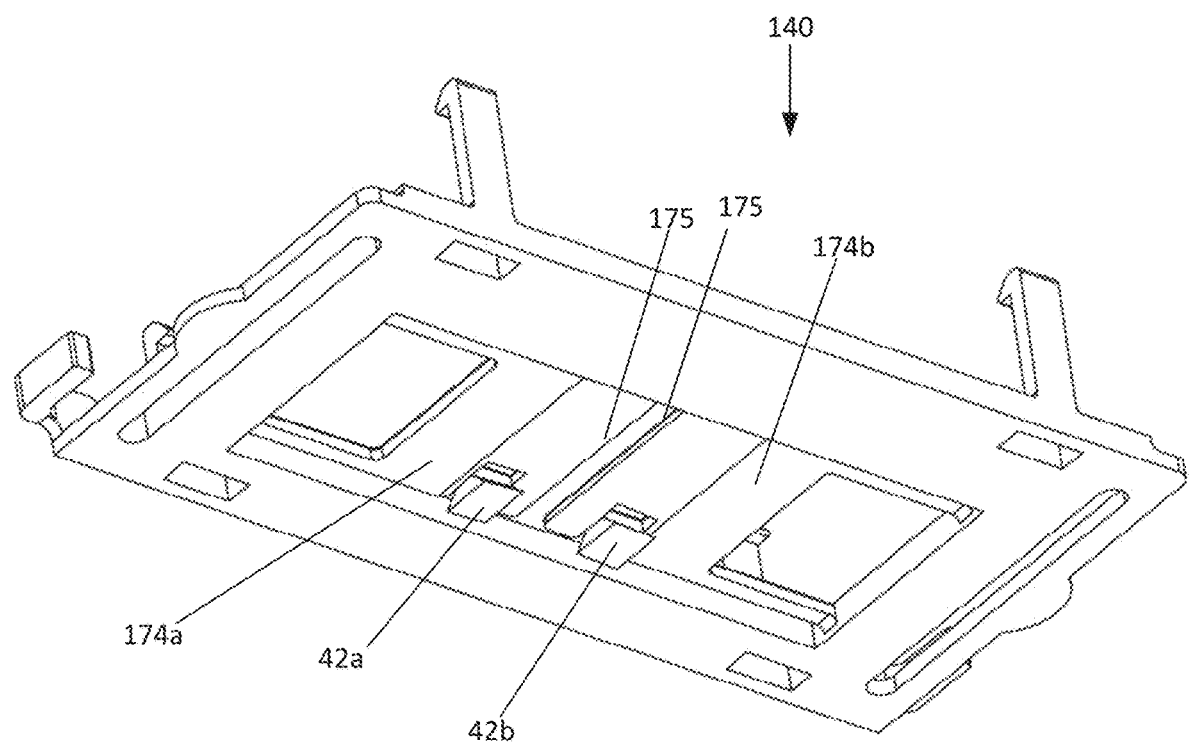
FIG. 15 is a perspective view depicting a bottom view of the optical component holder of FIG. 14.
Figure 16:
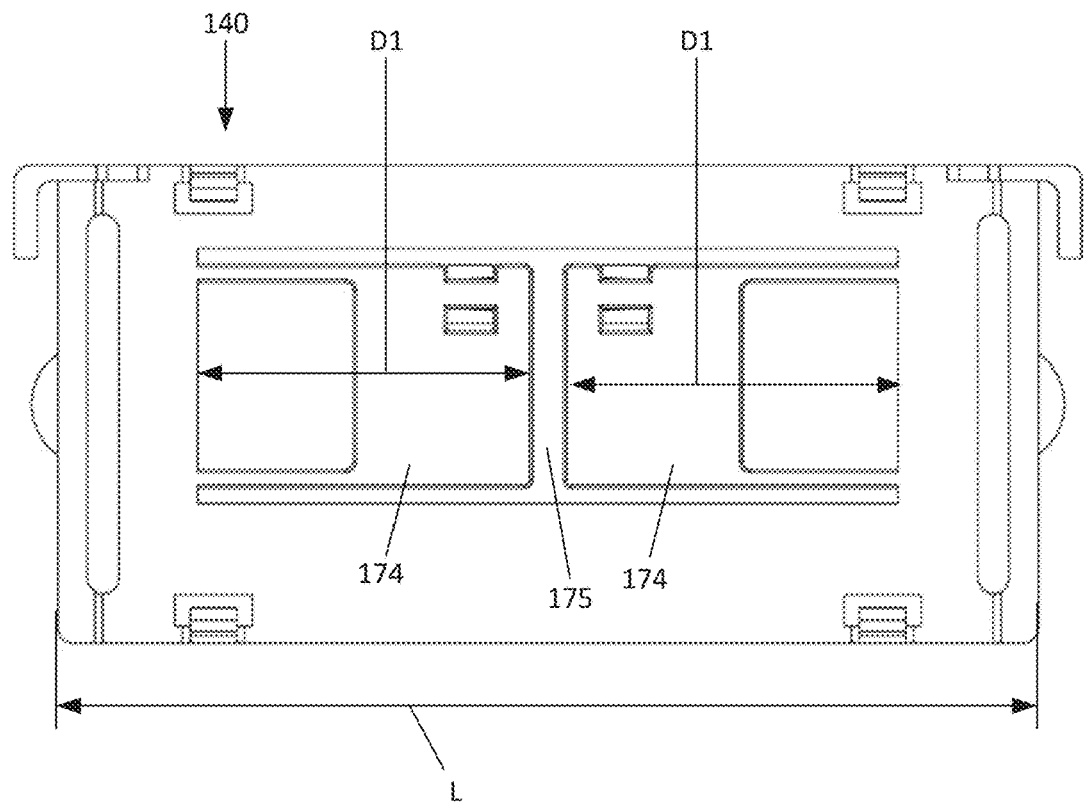
FIG. 16 is a top view of the optical component holder of FIG. 14.
Figure 17:
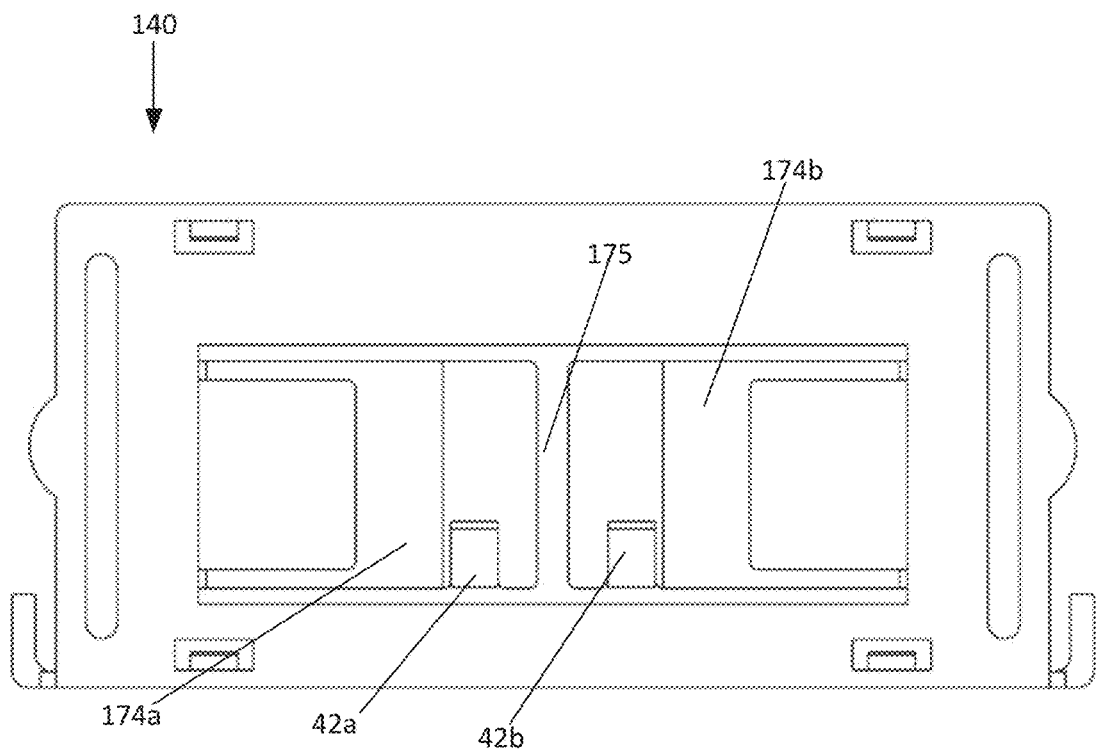
FIG. 17 is a bottom view of the optical component holder of FIG. 14.
Figure 18:
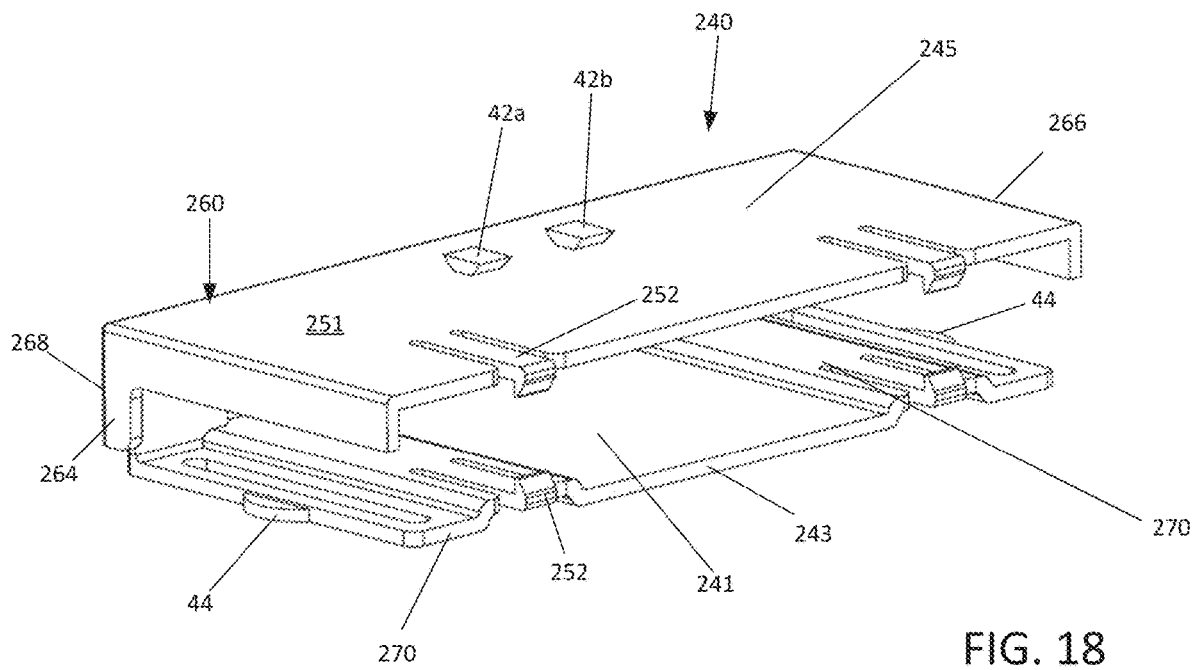
FIG. 18 is a perspective view depicting a first major outer side of another optical component holder in accordance with the principles of the present disclosure.
Figure 19:
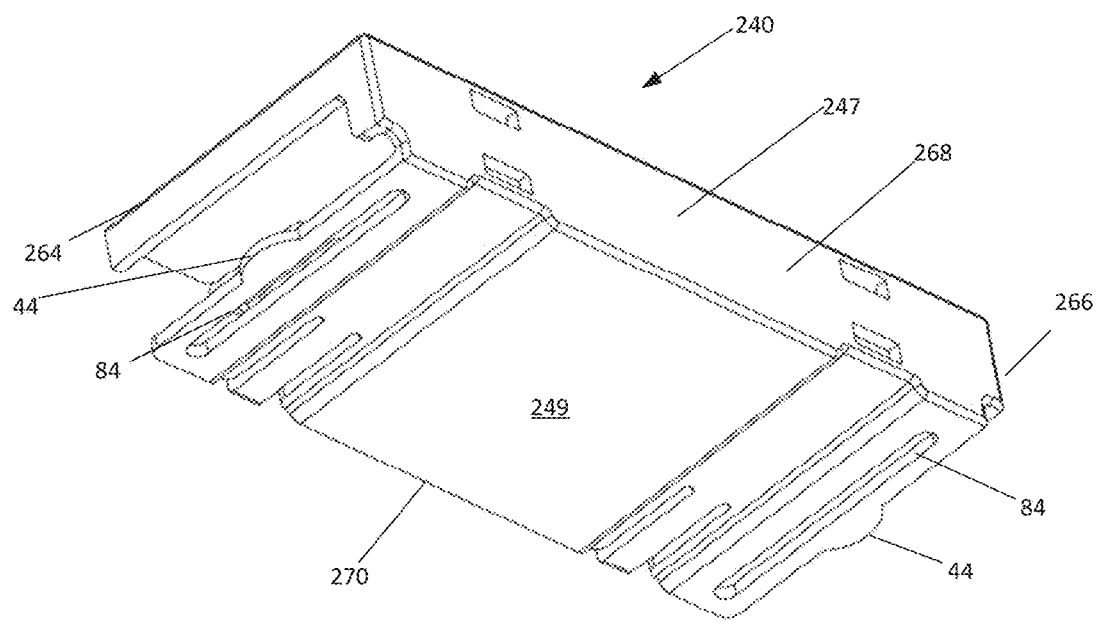
FIG. 19 is a perspective view of the optical component holder of FIG. 18 depicting an opposite second major outer side of the optical component holder.
Figure 20:
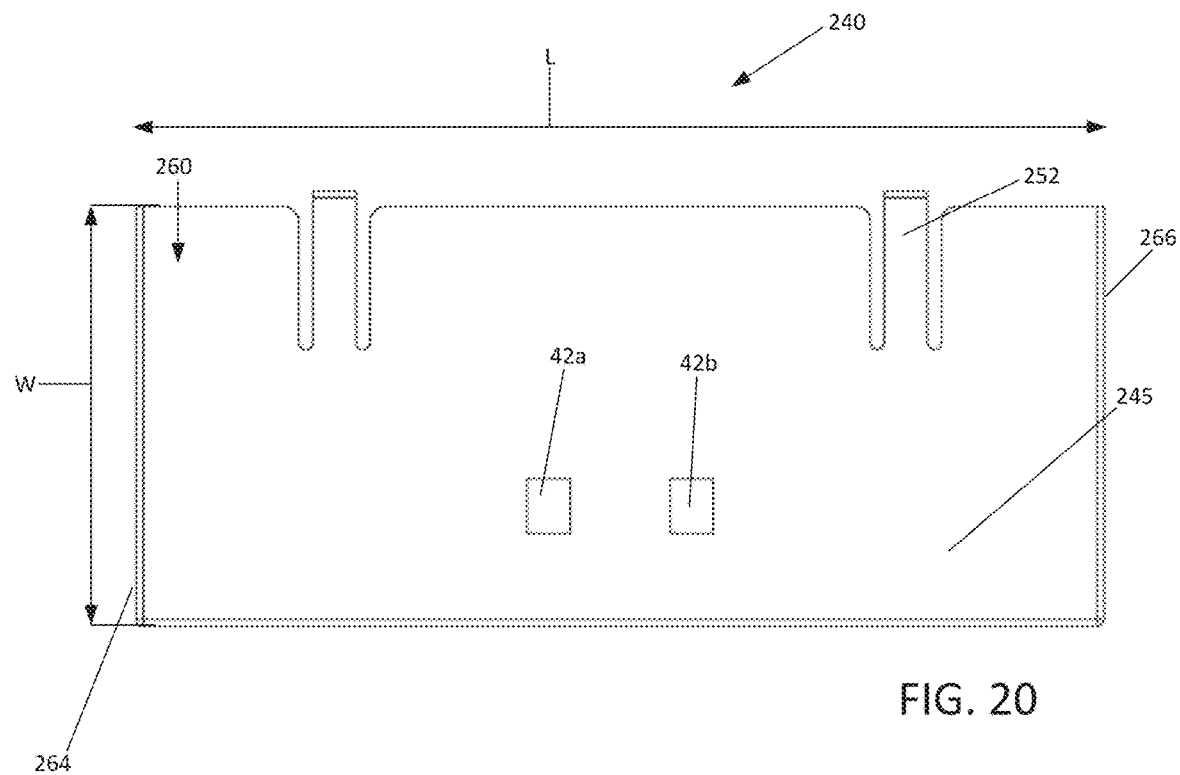
FIG. 20 is a plan view of the optical component holder of FIG. 18 depicting the first major outer side of the optical component holder.
Figure 21:
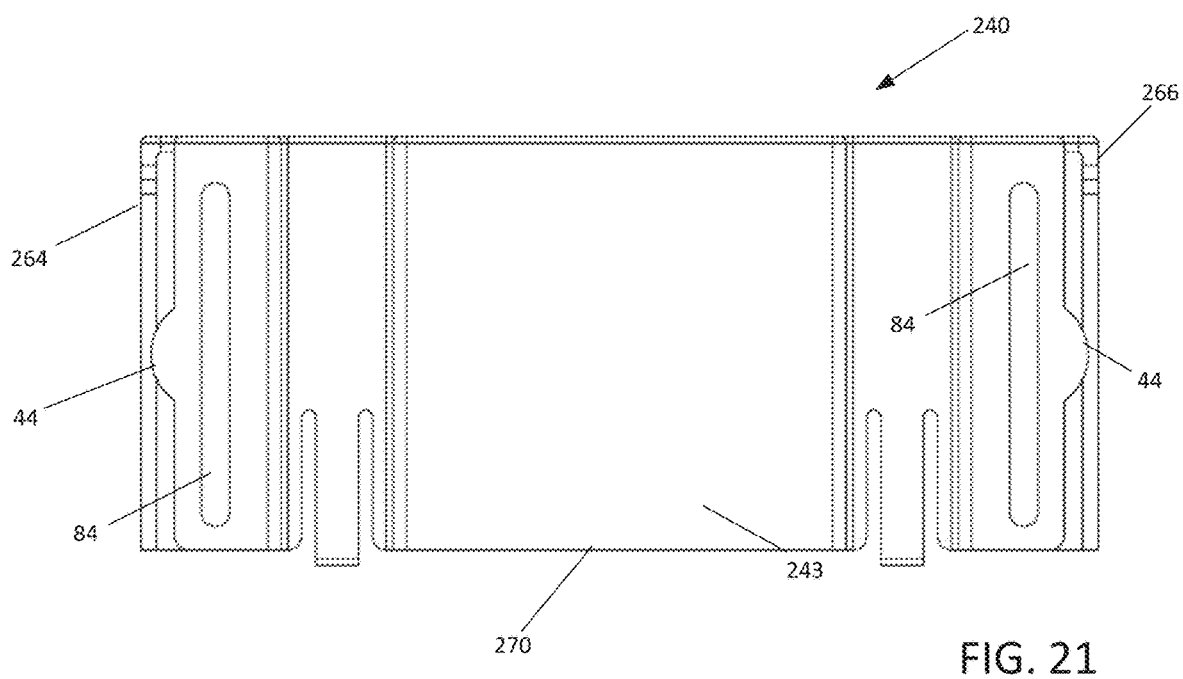
FIG. 21 is a plan view of the optical component holder of FIG. 18 depicting the second major outer side of the optical component holder of FIG. 18.
Figure 22:
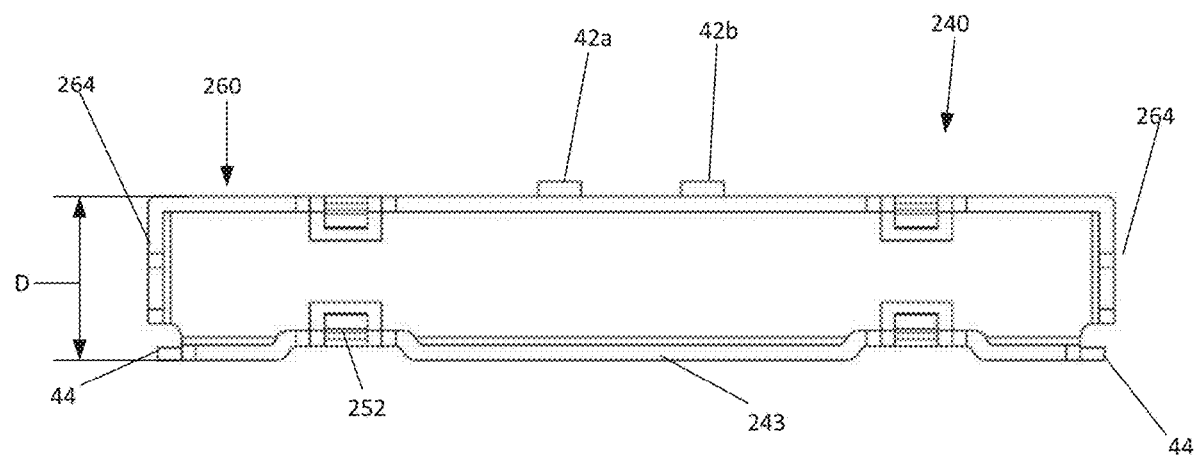
FIG. 22 is a side view of the optical component holder of FIG. 19.
Figure 23:
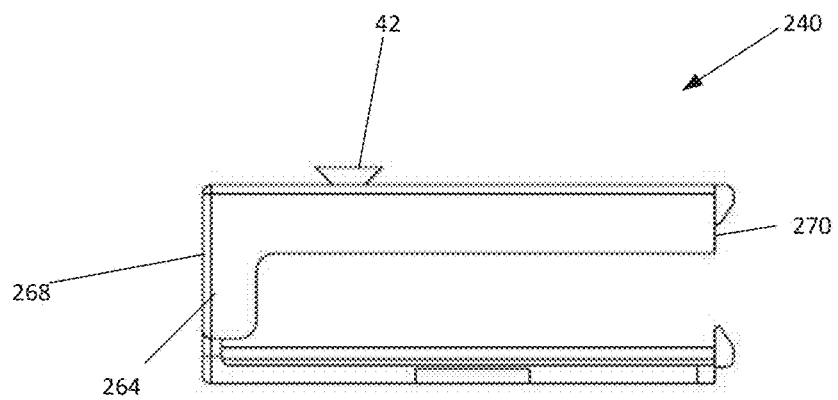
FIG. 23 is an end view of the optical component holder of FIG. 19.

FIGS. 3-11 depict a first example of an optical component holder 40 in accordance with the principles of the present disclosure. The optical component holder 40 includes first mounting features depicted as dovetail projections 42 that are compatible with the attachment arrangements 22 of the tray of FIG. 1. For example, FIG. 12 shows two optical component holders 40 secured to the tray 20 by interlocks provided between the dovetail projections 42 of the holders 40 and the dovetail slots 24 of the attachment arrangements 22. The optical component holder 40 also includes second mounting features depicted as end tabs 44 that are compatible with the attachment arrangements 32 of the tray 30 of FIG. 2. For example, FIG. 13 depicts the optical component holder 40 secured to the tray 30 by an interlock between the end tabs 44 of the holder 40 and the receptacles 34 of one of the attachment arrangements 32 of the tray 30. It will be appreciated that the mounting features can also be referred to as mounting elements, mounting structures, connection features, connection elements, connection structures, attachment features, attachment elements, attachment structures, interlock features, interlock elements, interlock structures, or the like. Additionally, it will be appreciated that mounting features are compatible with a corresponding attachment arrangement if the mounting features and the attachment arrangement can interlock or otherwise engage one another to allow for mutual coupling. It will be appreciated that the holder 40 can also be mounted to additional structures such as panels and enclosures that can include corresponding attachment arrangements such as the arrangements 22, 32.

The optical component holder 40 of FIGS. 1-11 is depicted as a plate-style holder having a top side 50 at which an optical component can be secured. In the depicted example, latching arms 52 are provided for securing an optical component to the top side 50 of the optical component holder 40. Referring to FIG. 13, an example optical component 54 is secured to the top side 50 of the optical component holder 40 by the latching arms 52. It will be appreciated that the optical component 54 is representative of a variety of different types of optical components that may include, for example, components such as modules for securing fusion splices made between optical fibers, modules each containing one or more passive optical splitters, modules each containing at least one passible optical splitter, modules each containing at least one passive optical tap, and modules each containing at least one wavelength division multiplexer.

Referring to FIGS. 1-8, the optical component holder 40 includes a holder body 60 including a mounting location 62 at the top side 50 at which the optical component 54 can be secured (e.g. by the latching arms 52). The holder body has a length L a width W and a depth D. The length L extends between first and second ends 64, 66 of the holder body 60. The holder body 60 includes first and second sides 68, 70 that extend between the first and second ends 64, 66 of the holder body 60. The width W is defined between the first and second sides 68, 70 of the holder body 60. The depth D is perpendicular with respect to the length L and the width W and extends between the top side 50 and a bottom side 72 of the holder body 70. The top and bottom sides 50, 72 can also be referred to as first and second major sides of the holder body 70 and the first and second sides 68, 70 can also be referred to as minor sides of the holder 60.

Figure 3:
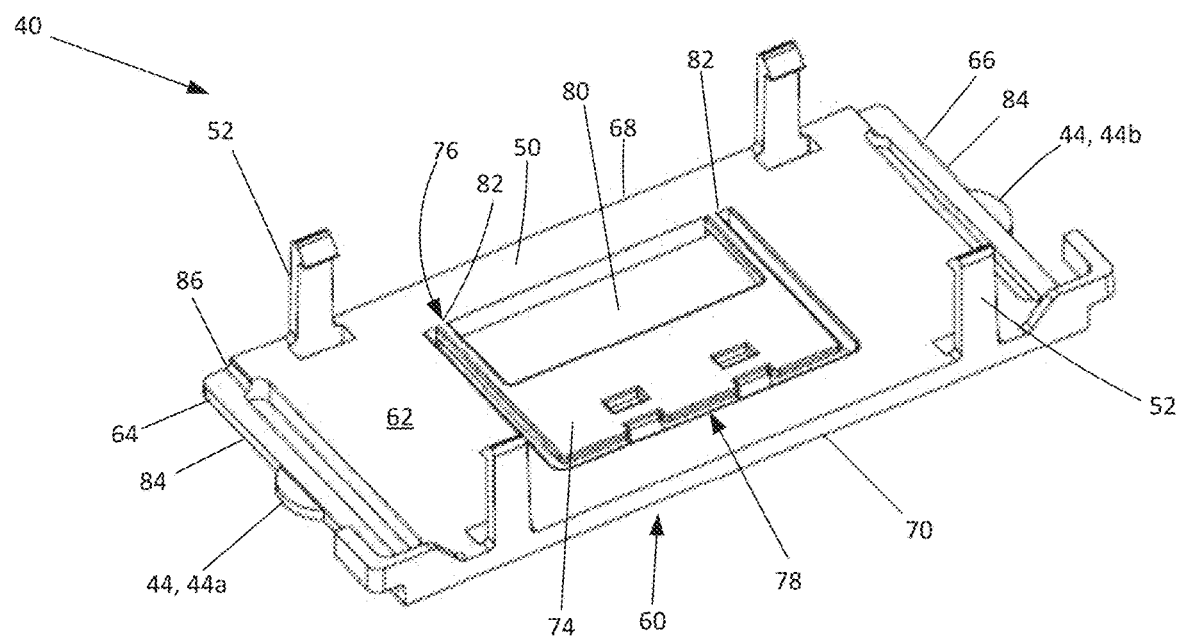
FIG. 3 is a perspective view showing a top side of an optical component holder in accordance with the principles of the present disclosure that includes mounting features that are compatible with the different attachment arrangements provided by the trays depicted at FIGS. 1 and 2.
Figure 4:
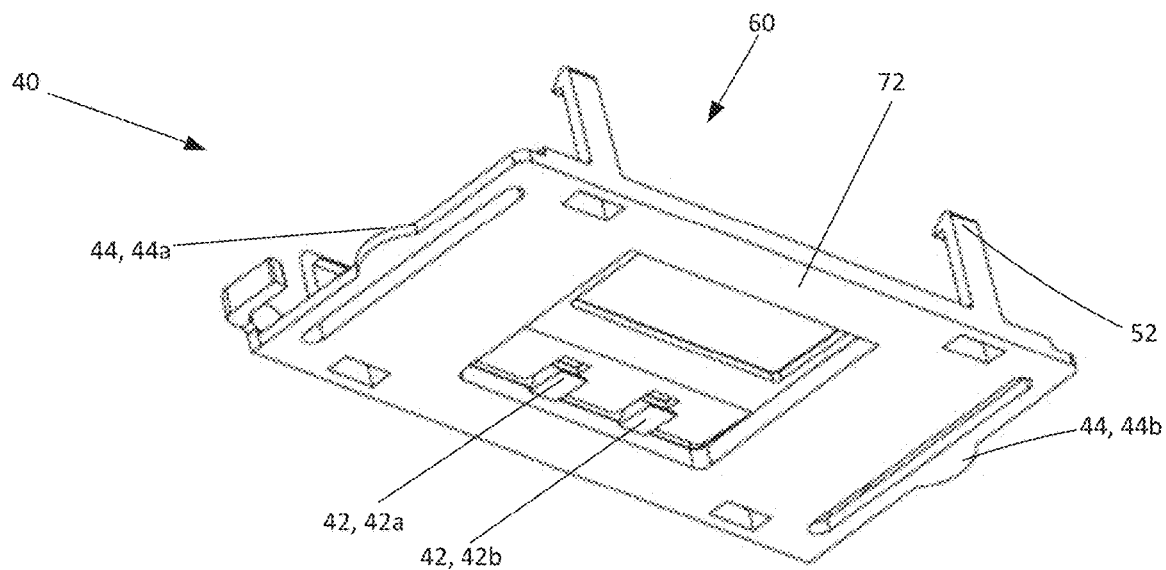
FIG. 4 is a perspective view depicting a bottom a side of the optical component holder of FIG. 3.
Figure 5:
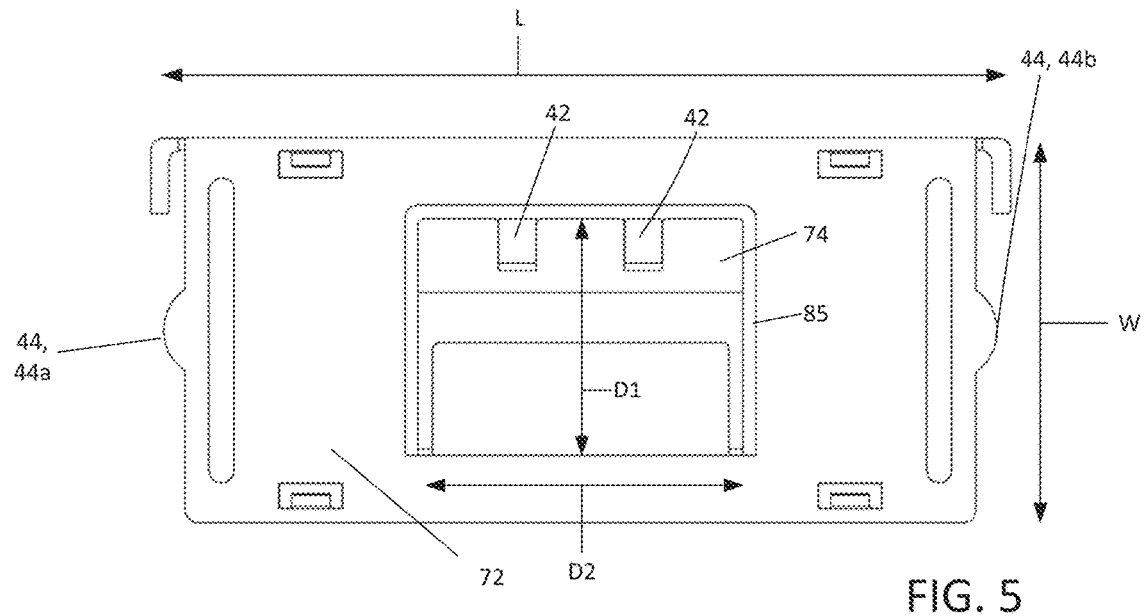
FIG. 5 is a bottom view of the optical component holder of FIG. 3.
Figure 6:
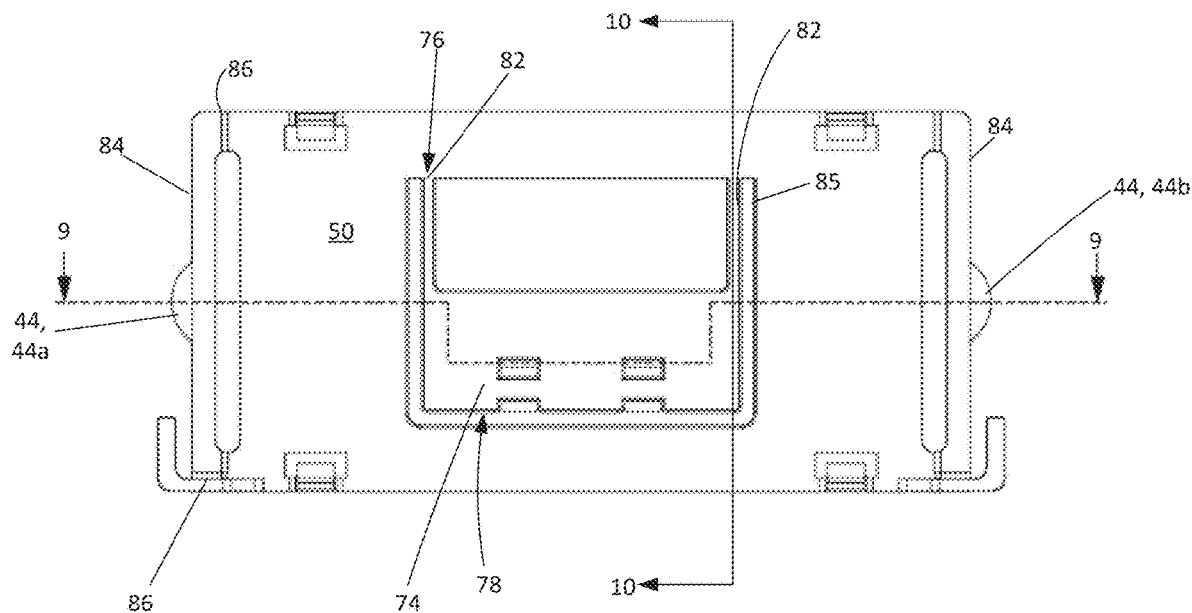
FIG. 6 is a top view of the optical component holder of FIG. 3.
Figure 7:
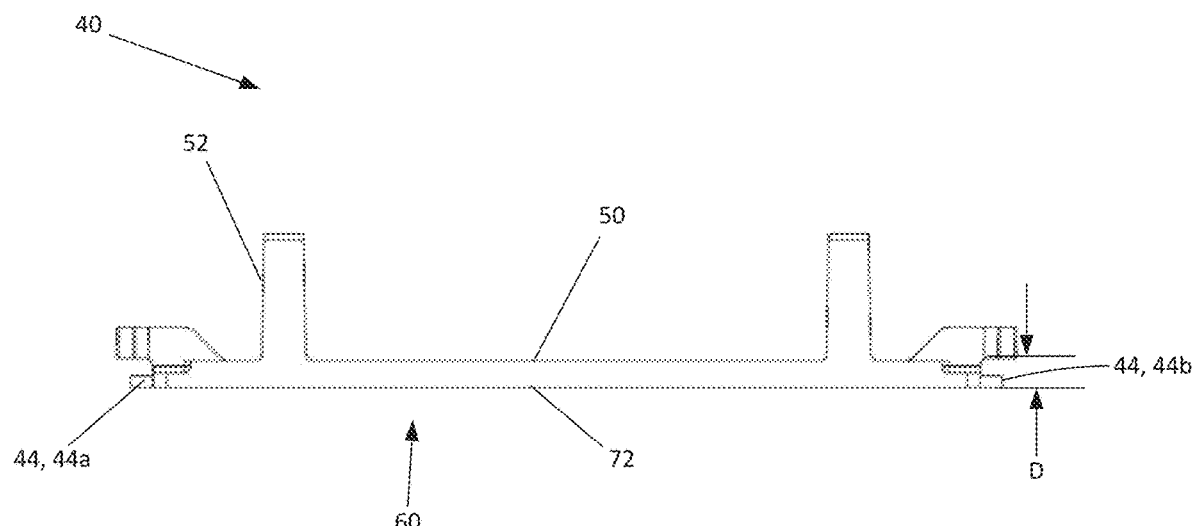
FIG. 7 is a side view of the optical component holder of FIG. 3.
Figure 8:
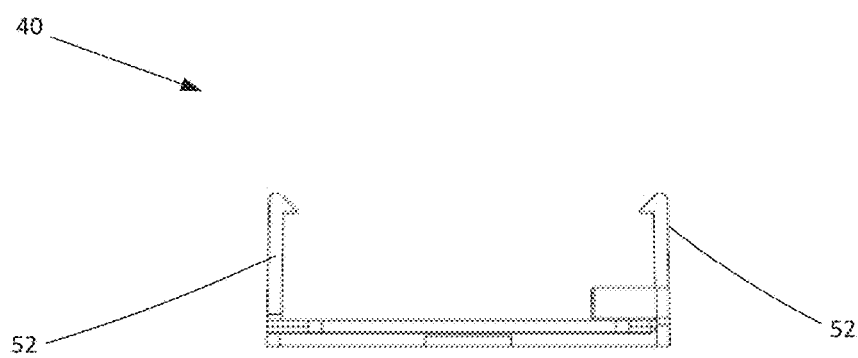
FIG. 8 is an end view of the optical component holder of FIG. 3.

The optical component holder 40 also includes first and second dovetail projections 42a, 42b that are movable relative to the holder body 60 in an orientation that extends along the depth D of the holder body 60 (e.g., the dovetail projections 42a, 42b are movable in an upward/downward direction). In the depicted example, the first and second dovetail projections 42a, 42b are both integrated with a single resilient cantilever member 74 having a base end 76 and a free end 78. In a preferred example, the dovetail projections 42a, 42b are unitarily formed with the cantilever member 74. The base end 76 of the cantilever member 74 is attached to the holder body 60. In one example, the base end 76 is unitarily formed with the holder 60. As shown at FIG. 3, the resilient cantilever member 74 defines an opening 80 adjacent to the base end 76 such that the base end 76 includes two space-apart connection points 82 at which the base end 76 is unitarily attached to the holder body 60 so as to be integrated with the holder body 60. In the depicted example, the holder body 60 is figured as a mounting plate, and the resilient cantilever member 74 is located at a central region of the mounting plate. The resilient cantilever member 74 is located within an opening 85 of the holder body 60 that extends through the depth D of the holder body 60.

It will be appreciated that the resilient nature of the cantilever member 74 allows the first and second dovetail projections 42a, 42b to be moved relative to the holder body 60 between an elevated position (see FIGS. 9 and 10) and a depressed position (see FIG. 11) when the first and second dovetail projections 42a, 42b are positioned at the elevated position, the dovetail projections 42a, 42b are positioned at the same level or higher than the end tabs 44 of the optical component holder 40. When the dovetail projections 42a, 42b are in the depressed position of FIG. 11, the dovetail projections 42a, 42b are positioned lower than the end tabs 44. It will be appreciated that the resilient nature of the cantilever member 74 allows the first and second dovetail projections 42a, 42b to be moved between the elevated and depressed positions. The resilient cantilever member 74 is in a non-flexed (e.g., at rest state) when the dovetail projections 42 are in the elevated position, and is in a downwardly flexed state when the first and second dovetail projections 42a, 42b are in the depressed position. When the first and second dovetail projections 42a, 42b are in the elevated position, the dovetail projections 42a, 42b are situated to not interfere with the ability to secure the optical component holder 40 to the second tray 30 using the end tabs 44. However, by flexing the cantilever member 74 downwardly to move the dovetail projections 42a, 42b to the depressed position, the dovetail projections 42a, 42b can be oriented to be readily received within the dovetail slots 24 of one of the attachment arrangements 22 of the tray 20 to provide attachment of the holder 40 to the tray 20. In an alternative example, the cantilever member 74 can be at an at rest state when the lower position such that the dovetail projections 42a, 42b can normally be in the lower position. With this type of arrangement, the cantilever member 74 will flex upwardly when one of the holders 40 is mounted to the second tray 30 such that the dovetail projections 42a, 42b do not interfere the ability of the end tabs 44 to fit within the corresponding receptacles 34 of a corresponding one of the attachment arrangements 32 of the tray 30.

The optical component holder 40 also includes first and second mounting tabs 44a, 44b located at the first and second ends 64, 66 of the holder body 60. The first and second mounting tabs 44a, 44b are resiliently movable relative to the holder body 60 in an orientation along the length L of the holder body 60. In one example, the tabs 44a, 44b are formed with semi-circular shapes, but other shapes could be used as well. In one example, the tabs 44a, 44b are connected to the holder body 60 by resilient end beams 84 that extend across the width W of the holder body 60. Each of the resilient end beams 84 has opposite ends 86 attached to the holder body 60. In a preferred example, the opposite ends 86 are unitarily formed with the holder body 60 such that the end beams 84 are attached to the holder body 60 by unitary connections.

In a preferred example, the optical component holder 40 has a plastic construction. In one example, the optical component holder 40 is formed through a molding process (e.g. injection molding), in which the entire optical component holder 40 (e.g. the holder body 60, the end beams 84, the end tabs 44, the latching arms 52, the resilient cantilever member 74 and the dovetail projections 42) are molded as a single, unitary piece (e.g., structure, part).

In certain examples, the resilient cantilever member 74 have a thickness that extends between a top side and a bottom side of the resilient cantilever member 74. The resilient cantilever member has a first dimension D1 that extends from the base end 76 to the free end 78. The first dimension D1 extends along the width W of the holder body 60. The first and second dovetail projections 42a, 42b are unitarily formed with the bottom side of the resilient cantilever member 74. The resilient cantilever member has a second dimension D2 that extends along the length L of the holder body 60. The second dimension D2 is longer than the first dimension D1. The first and second dovetail projections are spaced-apart along the second dimension D2.

FIGS. 14-17 depict a second optical component holder 140 in accordance with the principles of the present disclosure. The optical component holder 140 has the same basic construction as the optical component holder 40, except the single cantilever member 74 has been replaced with two separate resilient cantilever members 174. The first dovetail projection 42a is integrated with one of the flexible cantilever members 174 and the second dovetail projection 42b is integrated with other resilient cantilever member 174. The cantilevers 174 include first and second cantilevers 174a, 174b having free ends 175 that oppose each other at a central region of the holder body of the optical component holder 140. The first and second cantilevers 174a, 174b have first dimensions D1 that extend from base ends to free ends of the first and second cantilever members 174a, 174b. The first dimensions D1 extend along the length L of the holder body 60 of the optical component holder 140. The first and second cantilever members 174a, 174b have lengths that extend along the first dimensions D1.

FIGS. 18-23 depict a third optical component holder 240 in accordance with the principles of the present disclosure. Similar to the previous embodiments, the optical component holder 240 includes two different types of mounting structures compatible with two different types of attachment arrangements that may be provided on a tray, panel, enclosure or other structure to which it is desired to mount the optical component holder 240. In the depicted example, one of the mounting features includes the end tabs 44 connected to end beams 84 that allow the end tabs 44 to move resiliently along a length of the optical component holder 40. A second mounting feature includes dovetail projections 42a, 42b provided at a major outer side of the optical component holder 240. The optical component holder 240 is an envelope-style holder in which optical components can be inserted laterally into a pocket 241 defined by the holder 240. Latching arms 252 are provided for retaining the optical component within the pocket 241.

The optical component holder 240 includes a holder body 260 which defines the pocket 241 at which the optical component can be secured. The holder body 260 has a length L, a width W and a depth D. The length L extends between first and second ends 264, 266 of the holder body 260. The holder body includes first and second main walls 243, 245 that oppose one another and that extend between the first and second ends 264, 266. The pocket 241 is defined at least in part between the first and second main walls 243, 245. The width W is defined between first and second sides 268, 270 of the holder body 260 that extend between the first and second ends 264, 266 of the holder body 260. The first side 268 includes a side wall 247 that interconnects the first and second main walls 243, 245. The second side 270 has an open configuration suitable for allowing the optical component to be inserted into the pocket 241 through the second side 270. The first main wall 243 defines a first major outer side 249 of the holder body 260 and the second main wall 245 defines an opposite second major outer side 251 of the holder body 260. The depth D is perpendicular with respect to the length and the width and extends between the first and second major outer sides 249, 251 of the holder body 260. The mounting tabs 44a, 44b are located at the first and second ends 264, 266 of the holder body 260 at a location adjacent the first major outer side 249. The mounting tabs 44a, 44b are resiliently movable relative to the holder body 260 along the length of the holder body 260. The dovetail projections 42a, 42b project outwardly from the second major outer side 251 of the holder body 260.

Figure 24:
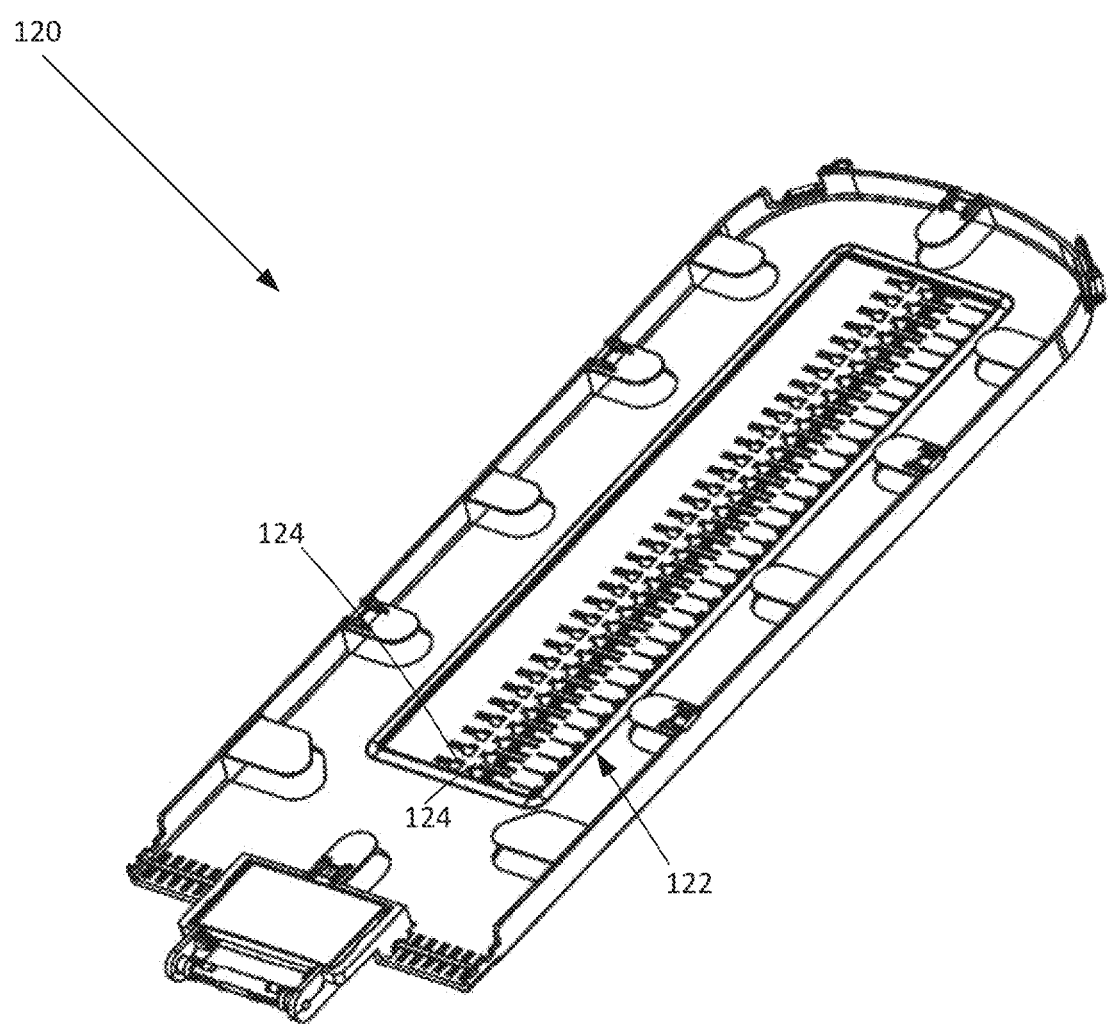
FIG. 24 is a perspective top view of a third tray having attachment arrangements, similar to the attachment arrangements shown in FIG. 1, for affixing optical component holders to the tray.
Figure 25:
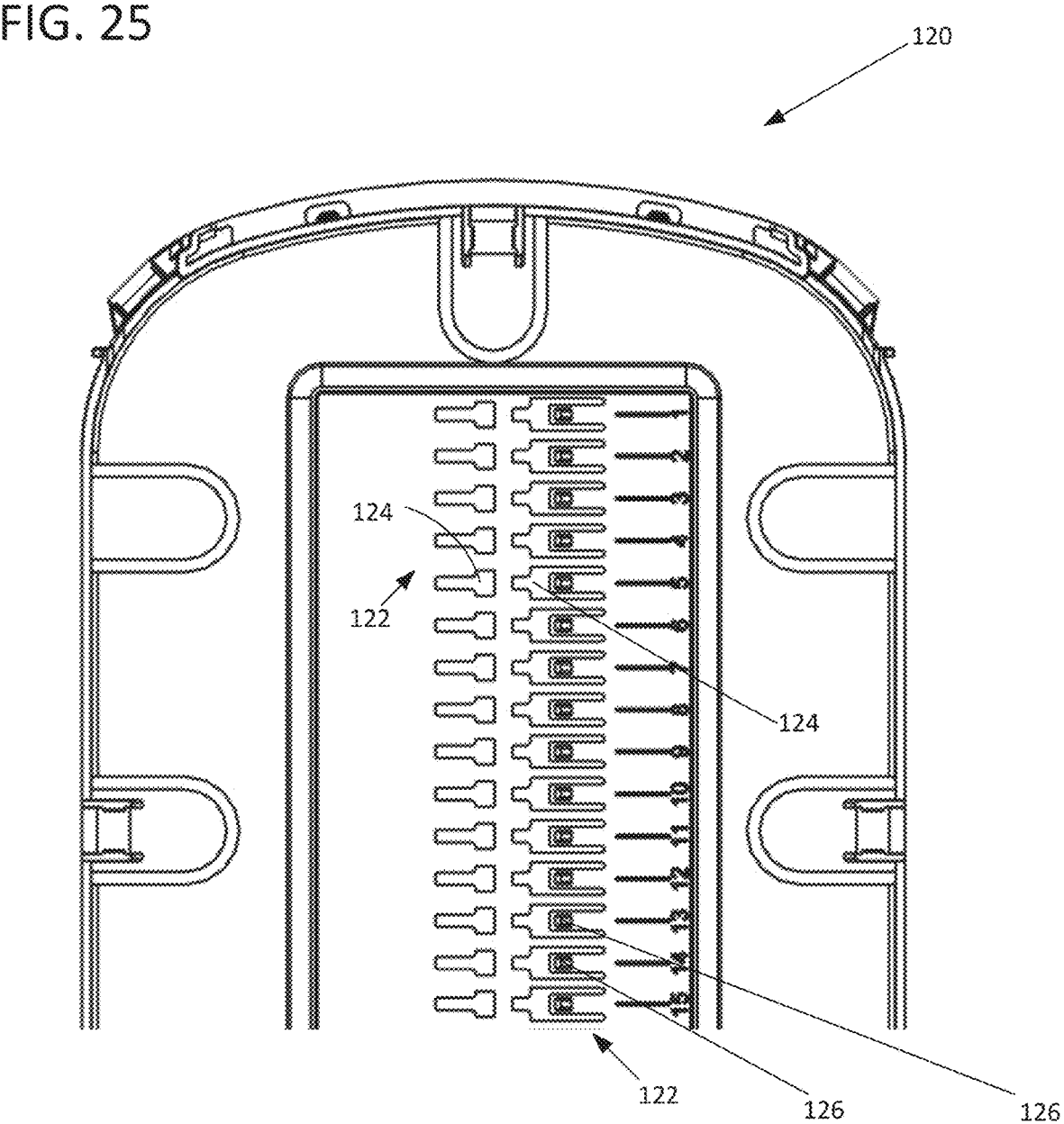
FIG. 25 is a top view of the attachment arrangements of FIG. 24.
Figure 26:
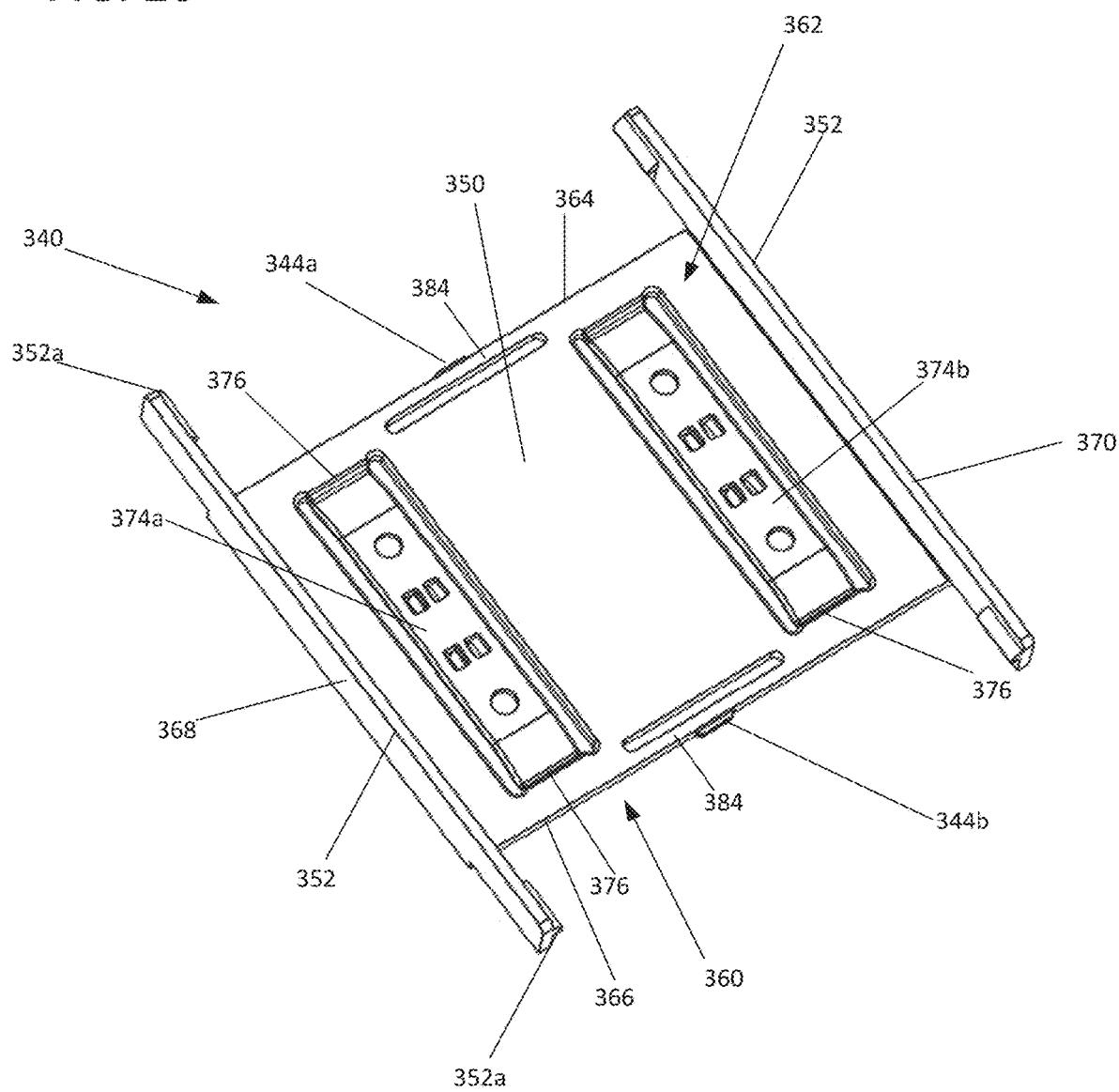
FIG. 26 is a perspective view showing a top side of an optical component holder in accordance with the principles of the present disclosure that includes mounting features that are compatible with the different attachment arrangements provided by the trays depicted at FIGS. 2 and 24.
Figure 27:
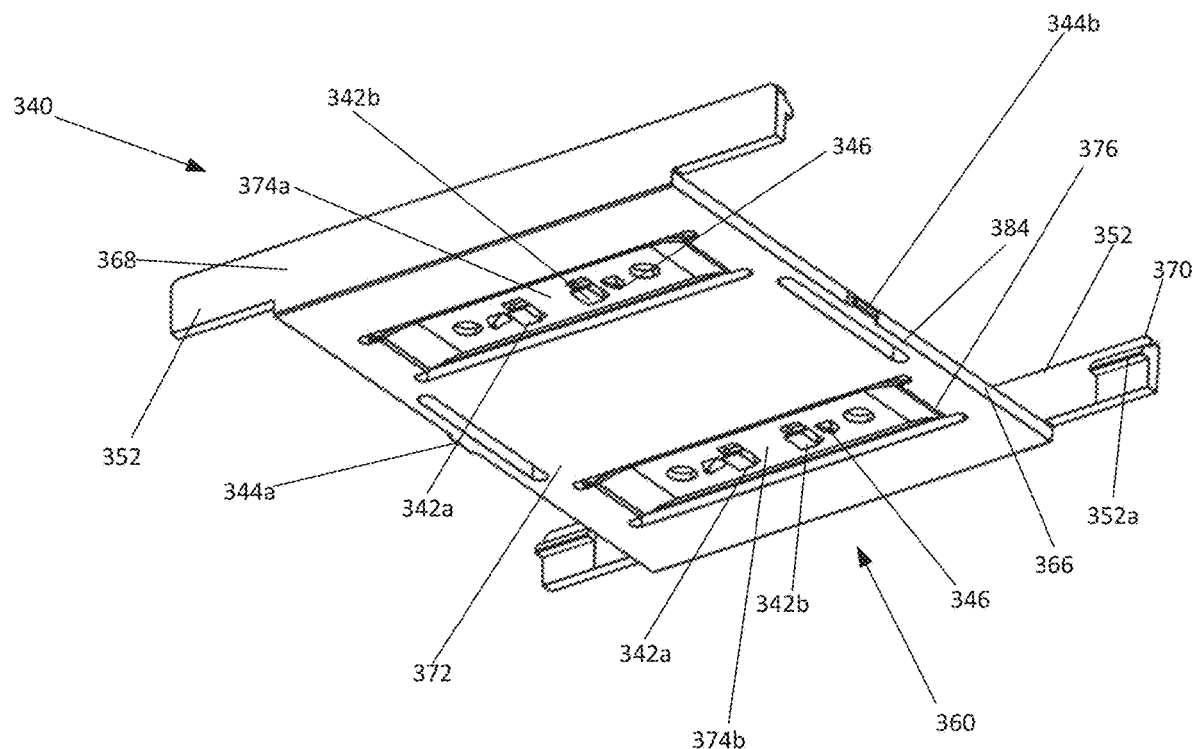
FIG. 27 is a perspective view depicting a bottom a side of the optical component holder of FIG. 26.
Figure 28:
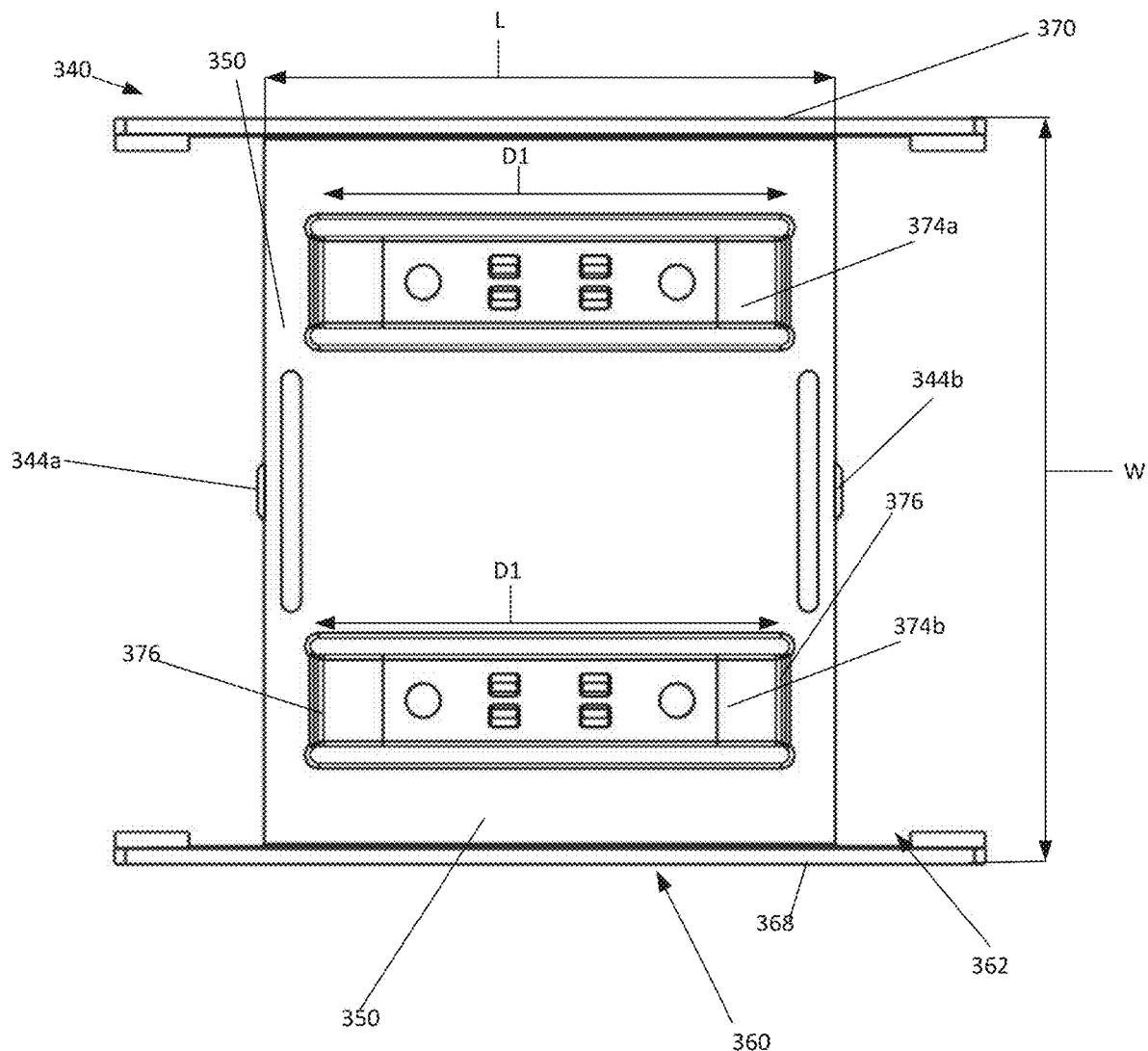
FIG. 28 is a top view of the optical component holder of FIG. 26.
Figure 29:
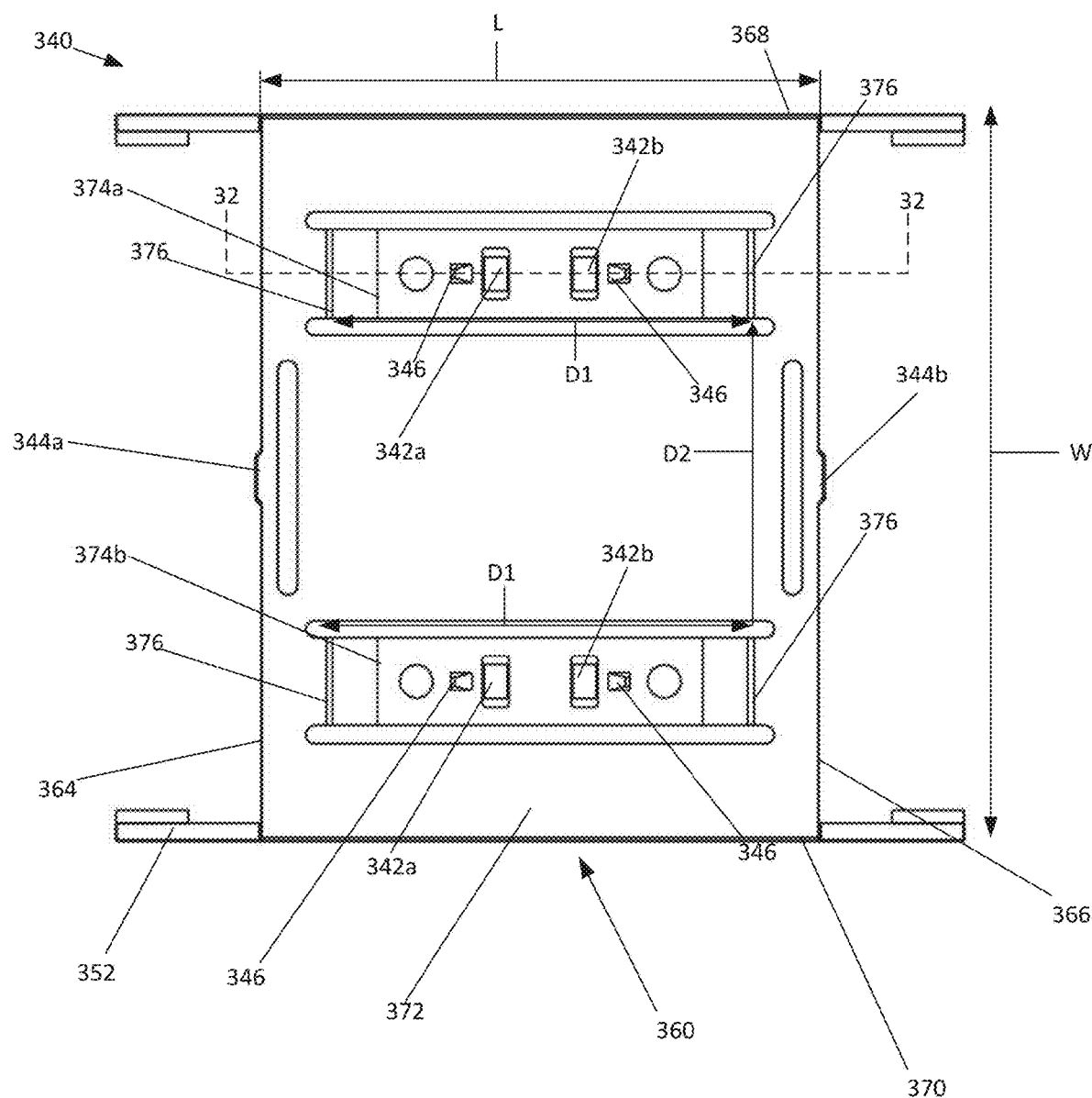
FIG. 29 is a bottom view of the optical component holder of FIG. 26.
Figure 32:
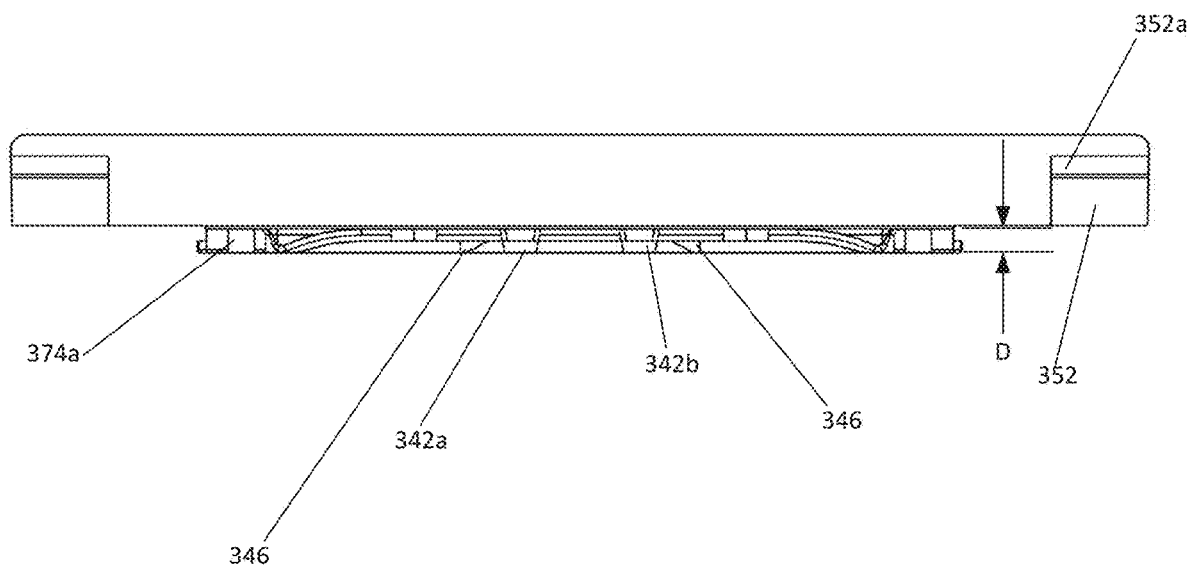
FIG. 32 is a cross-sectional view taken along section line 32-32 with a beam member of the component holder of FIG. 26 shown.

FIGS. 24 and 25 show a tray 120 having a plurality of attachment features 122 for securing component holders. The attachment features 122 each include a pair of dovetail slots 124 which have a dovetail shaped cross-section. The attachment features 122 additionally include stop receptacles 126. The attachment structures are similar to the attachment structures disclosed in PCT publication number WO2019/209643, the disclosure of which is hereby incorporated by reference.

FIGS. 26-32 show a fourth example of an optical component holder 340 in accordance with the principles of the present disclosure. Similar to the previous embodiments, the optical component holder 340 includes two different types of mounting structures compatible with two different types of attachment features that may be provided on a tray, panel, enclosure or other structure to which it is desired to mount the optical component holder 340. The optical component holder 340 includes a holder body 360 which has a length L, a depth D and a width W. The length L extends between first and second ends 364, 366. The width W is defined between first and second sides 368, 370 of the holder body 360. The depth is perpendicular with respect to the length L and the depth D. The depth D extends between a top side 350 and a bottom side 372 of the holder body 360.

Figure 33:
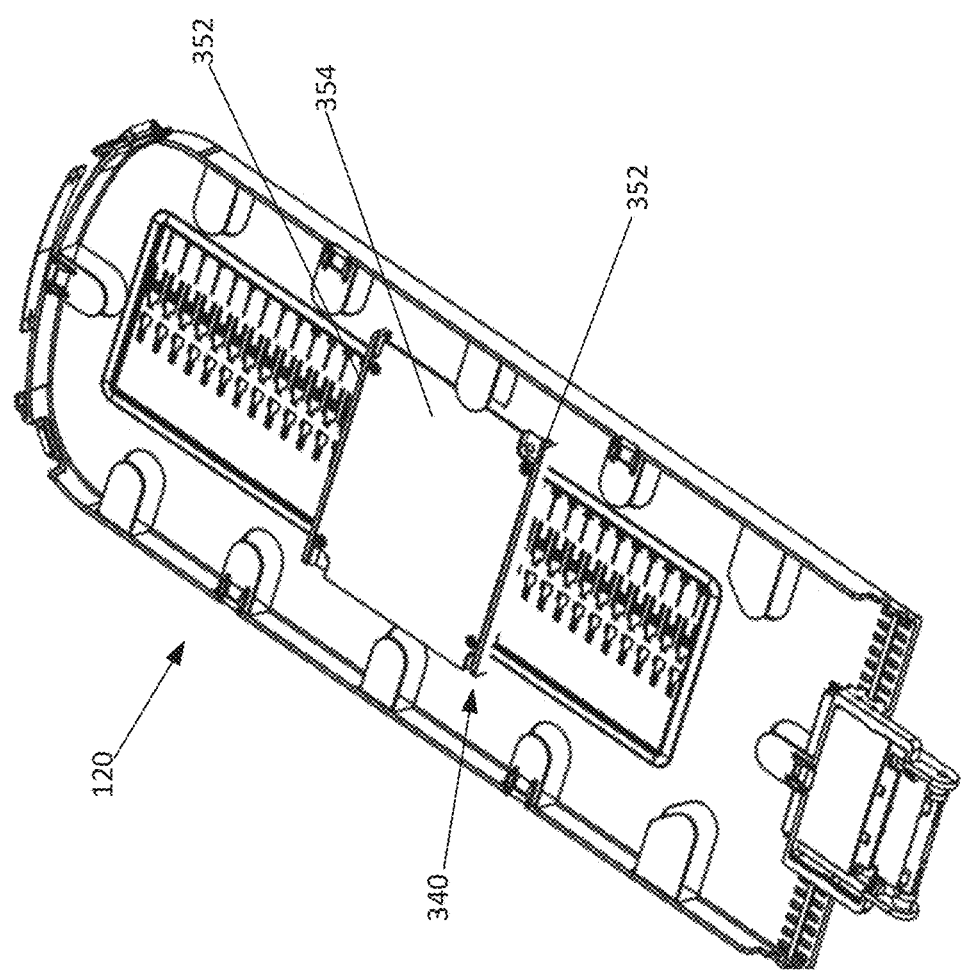
FIG. 33 is the optical component holder of FIG. 26 holding an optical component and mounted to the tray of FIG. 24.
Figure 34:
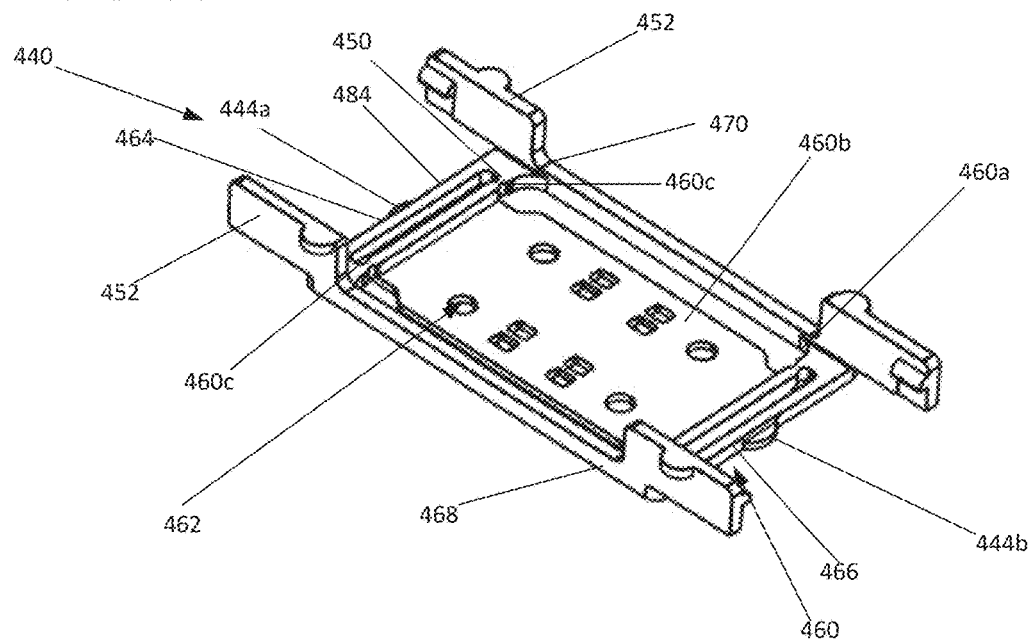
FIG. 34 is a perspective view showing a top side of an optical component holder in accordance with the principles of the present disclosure that includes mounting features that are compatible with the different attachment arrangements provided by the trays depicted at FIGS. 2 and 24.
Figure 35:
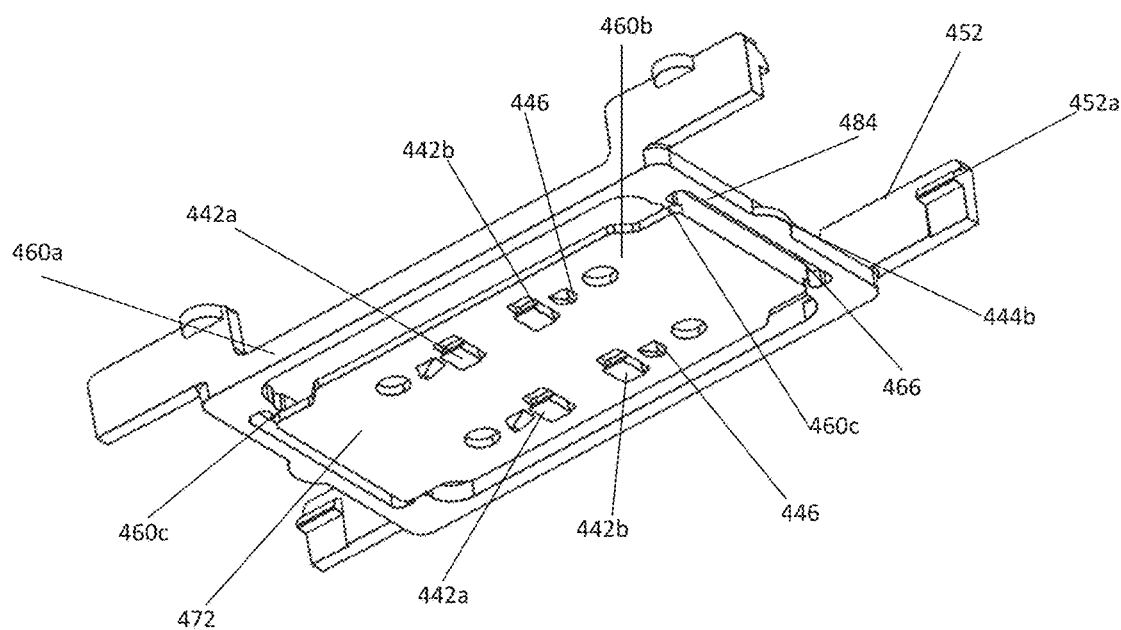
FIG. 35 is a perspective view depicting a bottom a side of the optical component holder of FIG. 34.
Figure 36:
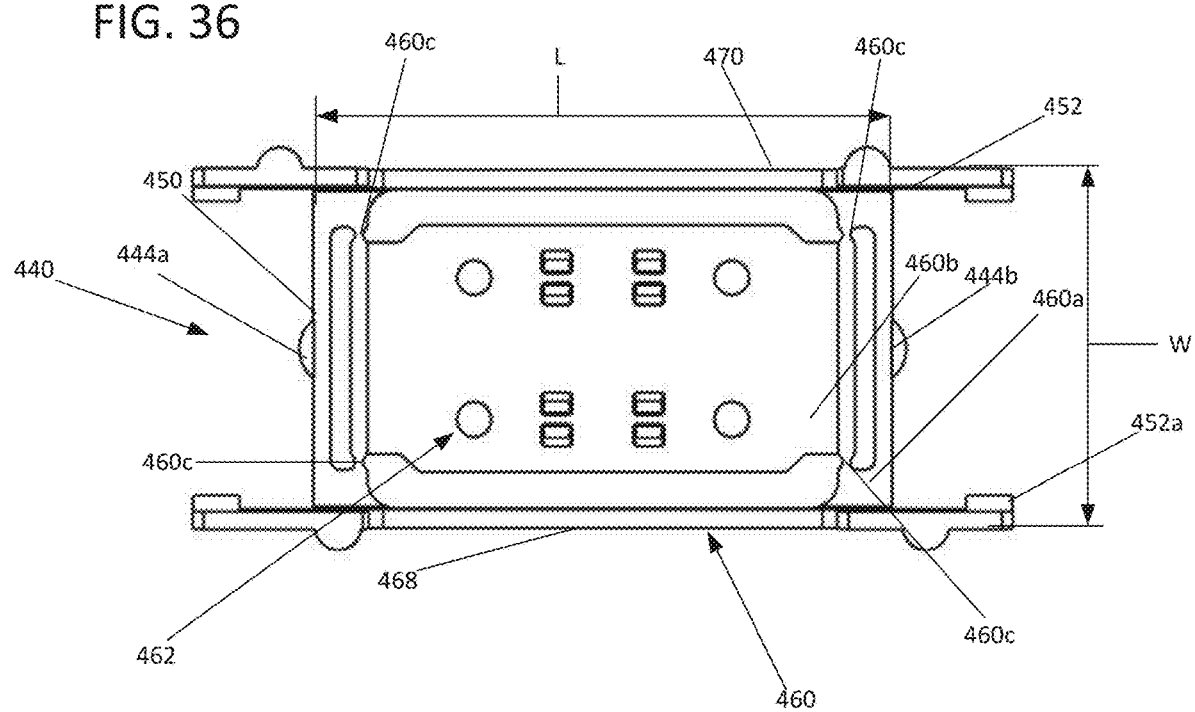
FIG. 36 is a top view of the optical component holder of FIG. 34.
Figure 37:
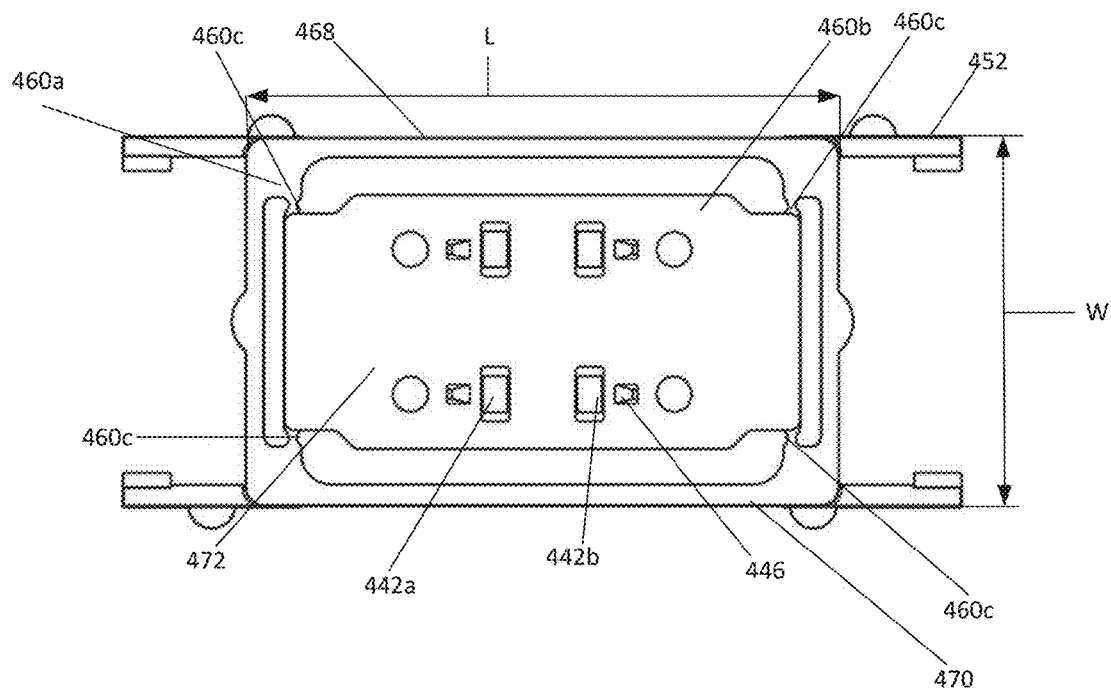
FIG. 37 is a bottom view of the optical component holder of FIG. 34.
Figure 38:
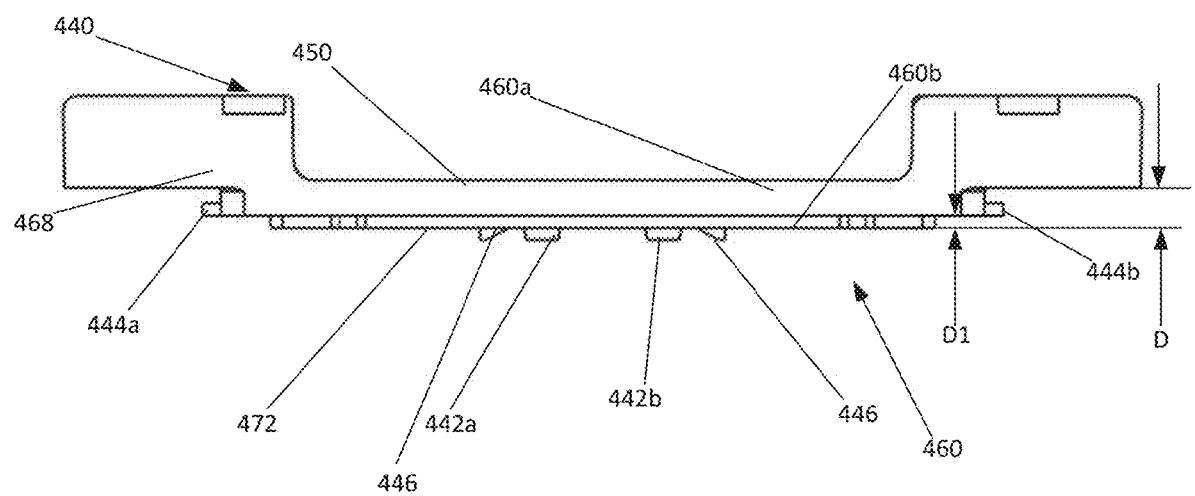
FIG. 38 is a side view of the optical component holder of FIG. 34.
Figure 39:
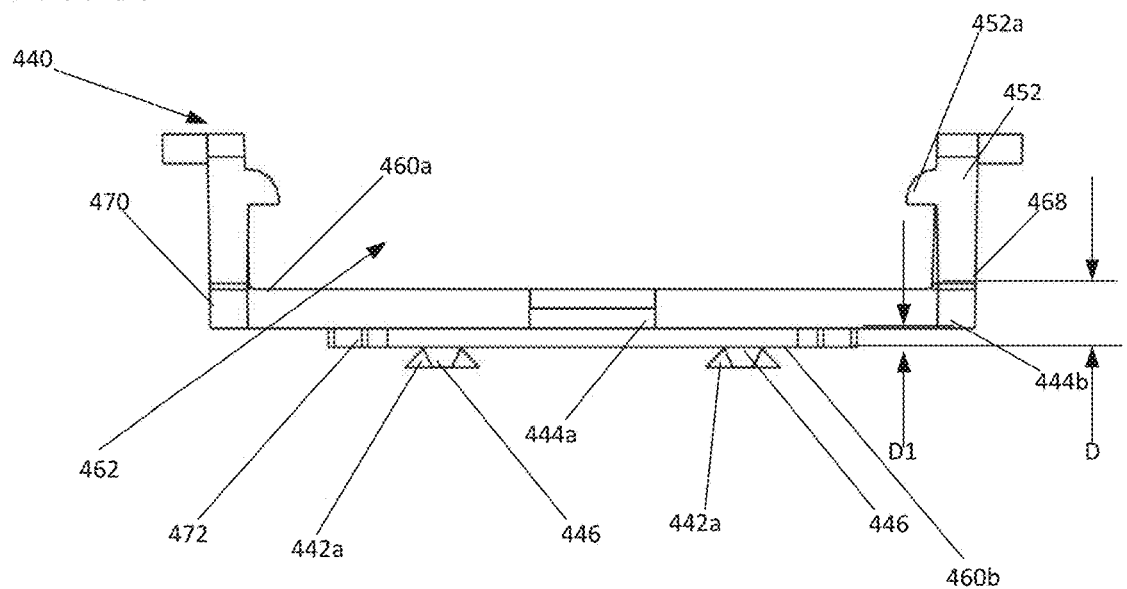
FIG. 39 is an end view of the optical component holder of FIG. 34.

The optical component holder 340 includes first mount features depicted as first and second dovetail projections 342a, 342b and stop structures 346 that are compatible with the attachment features 122 of the tray of FIGS. 24 and 25. FIG. 33 shows the optical component holders 340 secured to the tray 120 by interlocks provided between the dovetail projections 342a, 342b of the optical component holders 340 and the dovetail slots 124 of the attachment features 122. The stop structures 346 secure within the stop receptacles 126 to prevent movement of the optical component holder 340 relative to the tray 120. The optical component holder 340 includes second mounting features depicted as end tabs 344a, 344b that are compatible with the attachment arrangements 32 of the tray 30 of FIG. 2. The end tabs 344a, 344b are located respectively at the first and second ends 364, 366. The end tabs 344a, 344b are connected to the holder by resilient end beams 384 that extend across the width W of the holder body 360.

Like the optical component holders 40, 140 discussed above, the optical component holder 340 is depicted as a plate-style holder. An optical component can be secured at the top side 350 of the optical component holder 340. In the depicted example, latching portions 352 are provided for securing an optical component to the top side 350 of the optical component holder 340. Referring to FIG. 33, an example optical component 354 is secured to the top side 350 of the optical component holder 340 by the latching portions 352. The holder body 360 includes a mounting location 362 at the top side 350 at which the optical component 354 can be secured (e.g., by the latching portions 352). The latching portions 352 extend beyond the length L of the connector body 360, thereby allowing an optical component which has a greater length than the length L of the connector body 360 to be secured thereto. In this example, the latching portions include latches 352a which allow optical components can be snap-fit into.

The optical component holder 340 includes a first and second beam members 374a, 374b. The first and second beam members 374a, 374b extend along a dimension D1 between base ends 376 along the length of the holder body 360 and are separated by a second dimension D2 along the width of the holder body 360. The first and second beam portions each include the first and second dovetail projections 342a, 342b. It will be appreciated that the beam members 374a, 374b are resilient. In some examples, the distance D2 is spaced to provide the dovetail projections 342a, 342b to attachment features on a tray such as the tray of FIGS. 24 and 25. The resilient beams 342 operate similarly to the cantilevers members 74 discussed above, explained in further detail below.

The beam members 374a, 374b are integrated with the first and second dovetail projections 342a, 342b and allow the dovetail projections 342a, 342b to be moved between an elevated and a depressed position. The resilient beams 374a, 374b are in a non-flexed (e.g., at rest state) when the dovetail projections 342a, 342b are in the elevated position, and is in a downwardly flexed state when the first and second dovetail projections 342a, 342b are in the depressed position. When the first and second dovetail projections 342a, 342b are in the elevated position, the dovetail projections 342a, 342b are situated to not interfere with the ability to secure the optical component holder 340 to the tray 30 using the end tabs 44. However, by flexing the beam members 374a, 374b downwardly to move the dovetail projections 342a, 342b to the depressed position, the dovetail projections 342a, 342b can be oriented to be readily received within the dovetail slots 124 of one of the attachment features 122 of the tray 120 to provide attachment of the optical component holder 340 to the tray 120.

FIGS. 34-39 show a fifth example of an optical component holder 440 in accordance with the principles of the present disclosure. Similar to the previous embodiments, the optical component holder 440 includes two different types of mounting structures compatible with two different types of attachment arrangements that may be provided on a tray, panel, enclosure or other structure to which it is desired to mount the optical component holder 440. The optical component holder 440 includes a holder body 460 which has a length L, a depth D and a width W. The length L extends between first and second ends 464, 466. The width W is defined between first and second sides 468, 470 of the holder body 460. The depth is perpendicular with respect to the length L and the depth D. The depth D extends between a top side 450 and a bottom side 472 of the holder body 460.

Figure 41:
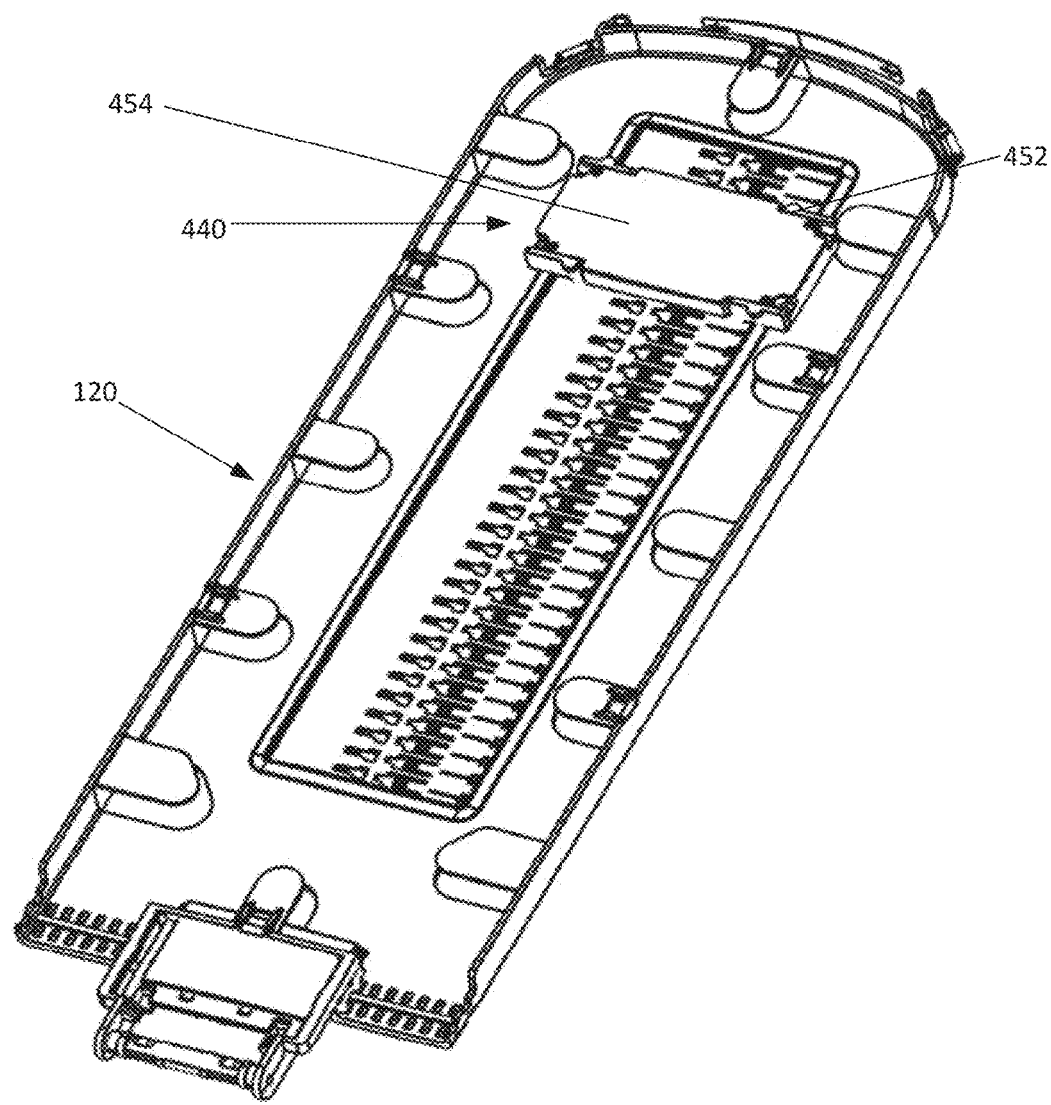
FIG. 41 is the optical component holder of FIG. 34 holding an optical component and mounted to the tray of FIG. 24.

In the depicted example, one of the mounting features includes end tabs 444a, 444b connected to end beams 484 that allow the end tabs 444a, 444b at the first and second ends 464, 466 to move resiliently along a length of the optical component holder 440. A second mounting feature is located on the bottom side 472 of the holder body 460 includes dovetail projections 442a, 442b. In this particular example, there are four dovetail projections 442a, 442b. The dovetail projections that are compatible with the attachment features 122 of the tray 120 shown in FIGS. 24 and 25. FIG. 41 shows the optical component holders 340 secured to the tray 120 by interlocks provided between the dovetail projections 442a, 442b of the optical component holder 440 and the dovetail slots 124 of the attachment features 122. The stop structures 446 are also secured within the stop receptacles. The end tabs 444a, 444b are compatible with the attachment arrangements 32 of the tray 30 of FIG. 2. The end tabs 444a, 444b are connected to the holder by resilient end beams 484 that extend across the width W of the holder body 460.

The optical component holder 440 is a plate-style holder similar to optical component holder 40, 140, 340 and includes latching portions 452 similar to the latching portions of the optical component holder 340. An optical component can be secured at the top side 450 of the holder body 460. Referring to FIG. 41, an example optical component 454 is secured to the top side 450 of the optical component holder 440 by the latching portions 452. The holder body 460 includes a mounting location 462 at the top side 450 where the optical component 454 can be secured (e.g., by the latching portions 452). Similar to the latching portions 352, the latching portions 452 extend beyond the length L of the holder body 460, thereby allowing for an optical component which has a greater length than the length L of the holder body 460 to be connected thereto. In this example, the latching portions include latches 452a which allow optical components can be snap-fit into.

Figure 40:
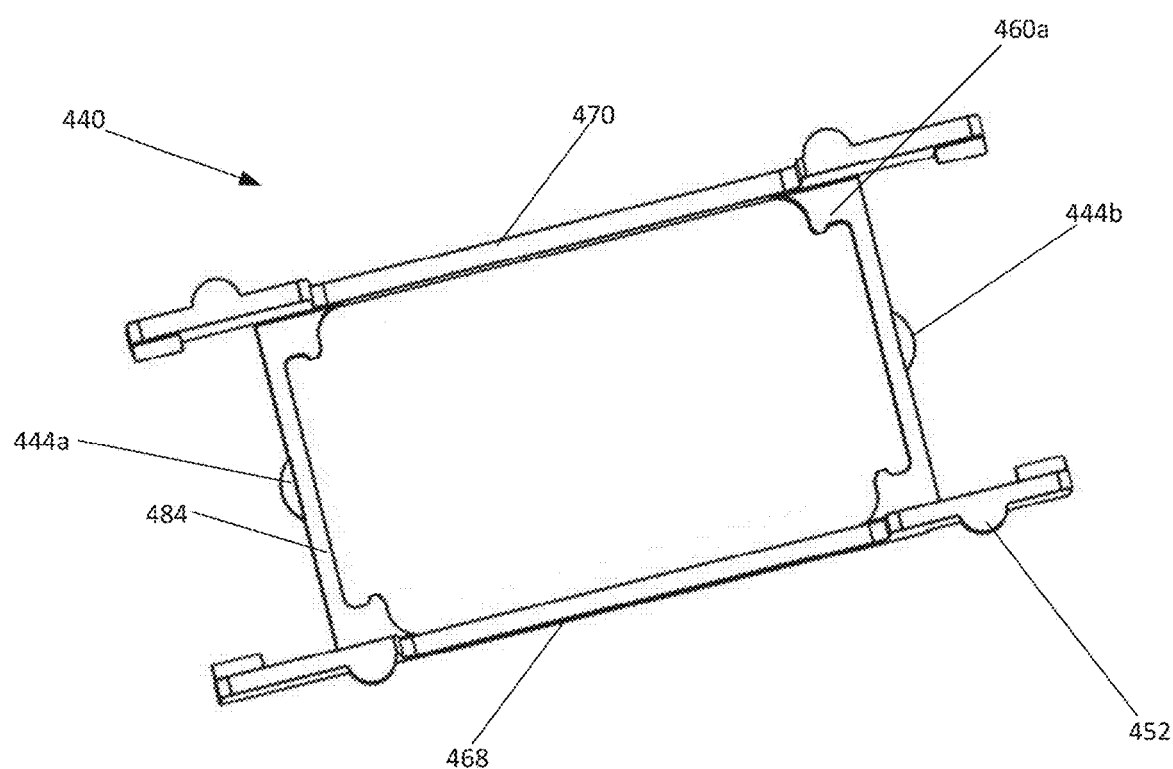
FIG. 40 is a perspective view of the optical component holder of FIG. 34 with a bottom portion of a base removed.

The holder body 460 includes an upper portion 460a and a lower portion 460b. The lower portion 460b is stepped downwardly from the upper portion 460a by a distance D1 along the depth D of the holder body 460. The lower portion 460b includes each of the dovetail projections 442a, 442b and is necessary to interlock with the tray 120. The lower portion 460b is attached to the upper portion 460a at corners 460c. The end tabs 444a, 444b are attached at the upper portion 460a. As the end tabs 444a, 444b are positioned upwardly from the lower portion 460b, the lower portion interferes with use of the end tabs when the end tabs are used to mount with a tray having features similar to the tray 30. To use the end tabs 444a, 444b for mounting with the tray 30, the lower portion 460b is removable. The corners 460c can be removed, for example cut, in order to remove the lower portion 460b. FIG. 40 shows the optical component holder 440 with the lower portion 460b removed.

What is claimed is:

1. A holder for an optical component, the holder comprising:
   a holder body including a mounting location at which the optical component can be secured, the holder body having a length, a width and a depth, the length extending between first and second ends of the holder body, the holder body including first and second sides that extend between the first and second ends of the holder body, the width being defined between the first and second sides of the holder body, and the depth being perpendicular with respect to the length and the width;

first and second mounting tabs located at the first and second ends, the first and second mounting tabs being resiliently moveable relative to the holder body in a first orientation along the length of the holder body; and first and second dovetail projections resiliently moveable relative to the holder body in a second orientation along the depth of the holder body.

2. The holder of claim 1, wherein the first and second mounting tabs are connected to the holder body by resilient end beams that extend across the width of the holder body and each have opposite ends attached to the holder body.

3. The holder of claim 2, wherein the resilient end beams are unitarily formed with the holder body.

4. The holder of claim 1, wherein the first and second dovetail projections are both integrated with a resilient cantilever having a base end attached to the holder body.

5. The holder of claim 4, wherein the resilient cantilever defines an opening adjacent the base end such that the base end incudes two spaced apart connection points at which the base end is attached to the holder body.

6. The holder of claim 5, wherein the resilient cantilever is unitarily attached to the holder body at the base end.

7. The holder of claim 1, wherein the first and second dovetail projections are respectively integrated with first and second separate resilient cantilever members each having a base end attached to the holder body.

8. The holder of claim 4, wherein the holder body is a mounting plate, and wherein the resilient cantilever is located at a central region of the mounting plate.

9. The holder of claim 8, wherein the resilient cantilever is located within an opening of the holder body that extends through the depth of the holder body.

10. The holder claim 1, wherein the first and second dovetail projections are resiliently moveable relative to the holder body between an elevated position in which the first and second dovetail projections are positioned at the same level or higher than the first and second mounting tabs and a depressed position in which the dovetail projections are positioned lower than the first and second mounting tabs.

11. The holder of claim 1, wherein the optical component is a splice holder for holding optical splices, a passive optical splitter module, a wavelength division multiplexer module or an optical tap module.

12. The holder of claim 8, wherein the mounting location is located at a top side of the mounting plate, and wherein the mounting location includes component latching arms that project from the top side of the mounting plate.

13. The holder of claim 6, wherein the resilient cantilever has a first dimension that extends from the base end to a free end of the resilient cantilever, and wherein the first dimension extends along the width of the holder body.

14. The holder of claim 13, wherein the resilient cantilever has a thickness that extends between a top side and a bottom side of the resilient cantilever, wherein the first and second dovetail projections are unitarily formed with the bottom side of the resilient cantilever, and wherein the resilient cantilever has a second dimension that extends along the length of the holder body, the second dimension being longer than the first dimension, and wherein the first and second dovetail projections are spaced-apart along the second dimension.

15. The holder of claim 7, wherein the first and second resilient cantilever members have free ends that oppose each other at a central region of the holder body, wherein the first and second resilient cantilever members have first dimensions that extend from base ends to the free ends of the first and second resilient cantilever members, and wherein the first dimensions extend along the length of the holder body.

16. The holder of claim 1, wherein there are four dovetail projections.

17. The holder of claim 16, wherein two dovetail projections are respectively integrated with first and second separate resilient beam members, each extending along the length of the holder body between two base ends, the two base ends each being attached to the holder body.

18. The holder of claim 1, wherein the first and second dovetail projections are integrated with a first resilient beam member, extending along the length of the holder body between two base ends, the two base ends each being attached to the holder body.

19. A holder for an optical component, the holder comprising:

a holder body including a pocket at which the optical component can be secured, the holder body having a length, a width and a depth, the length extending between first and second ends of the holder body, the holder body including first and second main walls that oppose one another and that extend between the first and second ends, the pocket being defined between the first and second main walls, the width being defined between first and second sides of the holder body that extend between the first and second ends of the holder body, the first side including a side wall that interconnects the first and second main walls, the second side having an open configuration suitable for allowing the optical component to be inserted into the pocket through the second side, the first main wall defining a first major outer side of the holder body and the second main wall defining an opposite second major outer side of the holder body, the depth being perpendicular with respect to the length and the width and extending between the first and second major outer sides of the holder body;

first and second mounting tabs located at the first and second ends of the holder body adjacent the first major outer side of the holder, the first and second mounting tabs being resiliently moveable relative to the holder body along the length of the holder body; and first and second dovetail projections that project outwardly from the second major outer side of the holder body.

20. A holder for an optical component, the holder comprising:

a holder body including a mounting location at which the optical component can be secured, the holder body having a length, a width and a depth, the length extending between first and second ends of the holder body, the holder body including first and second sides that extend between the first and second ends of the holder body, the width being defined between the first and second sides of the holder body, and the depth being perpendicular with respect to the length and the width;

first and second mounting tabs located at the first and second ends, the first and second mounting tabs being resiliently moveable relative to the holder body in a first orientation along the length of the holder body, the first and second mounting tabs projecting outwardly relative to the holder body in the first orientation along the length of the holder body; and first and second dovetail projections projecting outwardly relative to the holder body in a second orientation along the depth of the holder body.

21. The holder of claim 20, wherein the holder body includes an upper and a lower portion, the lower portion being stepped downward from the upper portion by a distance along the depth of the holder body.

22. The holder of claim 21, wherein the dovetail projections are integrated with the lower portion and the first and second mounting tabs are integrated with the upper portion.

23. The holder of claim 22, wherein the lower portion is removable from the upper portion.

24. The holder of claim 20, wherein the dovetail projections are removable from a remainder of the holder.

25. The holder of claim 20, wherein the lower portion is removable from the upper portion by cutting the lower portion at each of four corners.

\* \* \* \* \*